US 9,853,883 B2

(12) United States Patent
Thubert et al.

(10) Patent No.: US 9,853,883 B2
(45) Date of Patent: Dec. 26, 2017

(54) DEVICE MOBILITY IN A MESH NETWORK

(71) Applicant: Cisco Technology, Inc., San Jose, CA (US)

(72) Inventors: Pascal Thubert, La Colle sur Loup (FR); Eric Levy-Abegnoli, Valbonne (FR); Patrick Wetterwald, Mouans Sartoux (FR); Jean-Philippe Vasseur, Saint Martin d'Uria (FR)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 14/707,117

(22) Filed: May 8, 2015

(65) Prior Publication Data

US 2016/0330107 A1    Nov. 10, 2016

(51) Int. Cl.
| | |
|---|---|
| *H04L 12/28* | (2006.01) |
| *H04L 12/707* | (2013.01) |
| *H04L 12/933* | (2013.01) |
| *H04L 12/741* | (2013.01) |
| *H04L 12/751* | (2013.01) |
| *H04L 12/801* | (2013.01) |
| *H04W 40/02* | (2009.01) |

(Continued)

(52) U.S. Cl.
CPC .............. *H04L 45/22* (2013.01); *H04L 45/02* (2013.01); *H04L 45/74* (2013.01); *H04L 47/34* (2013.01); *H04L 49/1584* (2013.01); *H04W 40/02* (2013.01); *H04W 36/0011* (2013.01); *H04W 84/18* (2013.01)

(58) Field of Classification Search
USPC ......................................................... 370/392
See application file for complete search history.

(56) References Cited

U.S. PATENT DOCUMENTS

| | | | |
|---|---|---|---|
| 2005/0259595 A1* | 11/2005 | Preguica ................. | H04L 45/16 370/254 |
| 2006/0291404 A1* | 12/2006 | Thubert .................. | H04L 45/02 370/254 |

(Continued)

FOREIGN PATENT DOCUMENTS

GB        2460029 A      11/2009

OTHER PUBLICATIONS

ID/Locator Split-Based Mobility Scheme for Heterogeneous New Generation Network—Ved P. Kafle (published Oct. 21, 2011).*

(Continued)

*Primary Examiner* — Edan Orgad
*Assistant Examiner* — Sithu Ko
(74) *Attorney, Agent, or Firm* — Parker Ibrahim & Berg LLC; James M. Behmke; Stephen D. LeBarron

(57) ABSTRACT

In one embodiment, a device in a network receives a notification from a neighbor of the device indicative of a child node of the device requesting a parent change from the device to the neighbor. The device updates an existing routing path from the device to the child node to be routed through the neighbor, in response to receiving the notification from the neighbor. The device receives an instruction to remove the updated routing path from the device to the child node through the neighbor. The device removes the updated routing path from the device to the child node, in response to receiving the instruction to remove the updated routing path.

18 Claims, 22 Drawing Sheets

(51) Int. Cl.
　　*H04W 84/18*　　(2009.01)
　　*H04W 36/00*　　(2009.01)

(56) References Cited

U.S. PATENT DOCUMENTS

| | | | | |
|---|---|---|---|---|
| 2007/0275726 | A1* | 11/2007 | Lee | H04W 36/0016 455/436 |
| 2009/0040987 | A1* | 2/2009 | Hirano | H04L 29/12264 370/338 |
| 2009/0147699 | A1* | 6/2009 | Ruy | H04L 29/12254 370/254 |
| 2009/0262718 | A1* | 10/2009 | Meier | G06Q 20/3674 370/338 |
| 2010/0111040 | A1 | 5/2010 | Perras | |
| 2010/0118774 | A1 | 5/2010 | Gotthard et al. | |
| 2014/0003322 | A1 | 1/2014 | Grinshpun et al. | |

OTHER PUBLICATIONS

Montenegro et al. "Transmission of IPv6 Packets over IEEE 802.15.4 Networks"; Network Working Group, Standards Track, Sep. 2007, pp. 1-30.

Thubert et al. "Requirements for an update to 6LoWPAN ND draft-thubert-6lo-rfc6775-update-reqs-06"; 6Lo, Jan. 14, 2015, pp. 1-17.

Hui et al. "Compression Format for IPv6 Datagrams over IEEE 802.15.4-Based Networks"; Internet Engineering Task Force (IETF), Standards Track, Sep. 2011, pp. 1-24.

Shelby et al. Neighbor Discovery Optimization for IPv6 over Low-Power Wireless Personal Area Networks (6LoWPANs), Nov. 2012, pp. 1-55.

International Search Report dated Jul. 21, 2016 issued in connection with PCT/US2016/029317.

Huang et al: "A Mobility Management Scheme for Wireless Mesh Networks", Global Telecommunications Conference, 2007, Globecom '07, IEEE, Piscataway, NJ, USA, Nov. 1, 2007, pp. 5092-5096.

Awerbuch et al: "Ad hoc On Demand Distance Vector (AODV) Routing Protocol", CS: 647 Advanced Topics in Wireless Networks, Dec. 28, 2013, pp. 1-67.

Tuomas Aura Microsoft Research: "Cryptographically Generated Addresses (CGA), draft-aura-cga-00.txt", 5. JCT-VC Meeting; 96. MPEG Meeting, Mar. 16, 2011-Mar. 23, 2011, Geneva, (Joint Collaborative Team on Video Coding of ISO/IEC JTC1/SC29/WG11 and ITU-T SG.16); http://wftp3.itu.int/av-arch/jctvc-site/, Internet Engineering Task Force, IETF, CH, Feb. 1, 2003, XP015000150, ISSN: 0000-0004, Chapter 1.

* cited by examiner

DEVICE MOBILITY IN A MESH NETWORK

TECHNICAL FIELD

The present disclosure relates generally to computer networks, and, more particularly, to facilitating device mobility in a mesh network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

The myriad of challenges in LLNs makes supporting device mobility particularly difficult. Generally speaking, device mobility refers to the ability of a device to move from using one parent node in the network to using another node for purposes of routing traffic. In some cases, for example, the device may physically move to another location, necessitating the parent change. In other cases, a parent change may also be necessitated by other factors, such as changing environmental conditions typical in LLNs (e.g., the current parent of a node becomes unreachable due to an obstruction, etc.), without physical movement of the device.

With each potential parent change by nodes in an LLN, the routing topology of the network may require updating. However, sending routing protocol messages to effect such a change may also impinge on the function of the network. In particular, since the devices in an LLN often have constrained resources and use low bandwidth links, transmitting routing updates too frequently may negatively affect network traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
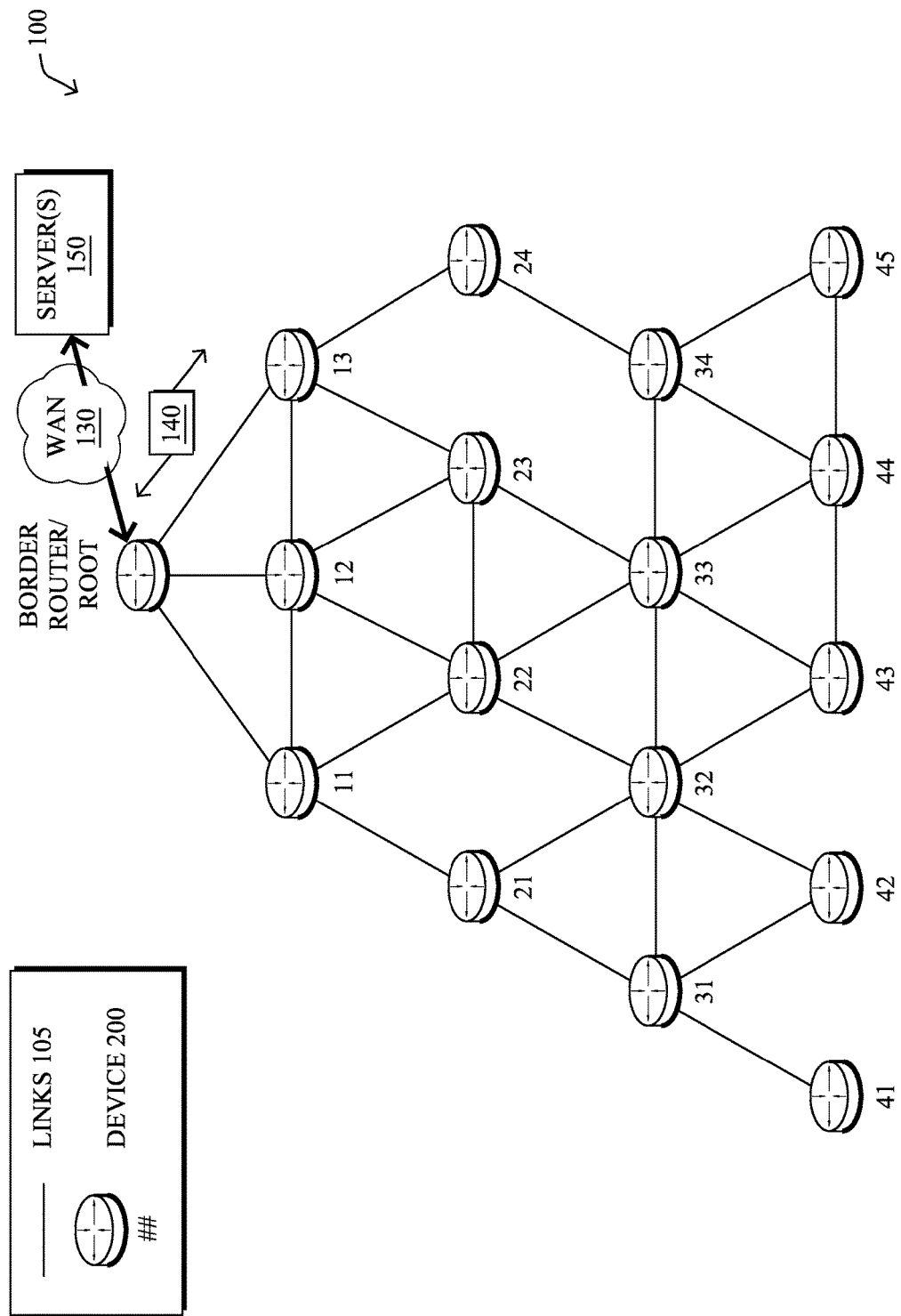
FIG. 1 illustrates an example communication network.

According to one or more embodiments of the disclosure, a device in a network receives a notification from a neighbor of the device indicative of a child node of the device requesting a parent change from the device to the neighbor. The device updates an existing routing path from the device to the child node to be routed through the neighbor, in response to receiving the notification from the neighbor. The device receives an instruction to remove the updated routing path from the device to the child node through the neighbor. The device removes the updated routing path from the device to the child node, in response to receiving the instruction to remove the updated routing path.

In further embodiments, a device in a network receives a request from a node in the network to establish the device as a parent of the node. The request indicates an existing parent of the node in the network. The device provides a notification to the existing parent of the node regarding the received request to establish the device as the parent of the node. The device adds the node as a child of the device. The device causes installation of a routing path from a root of the network to the node via the device.

In additional embodiments, a device in a network receives a routing protocol message that indicates a new routing path to a particular node in the network and an associated new sequence number. The device performs a comparison between the new sequence number and an existing sequence number associated with an existing routing path to the particular node maintained by the device. The device replaces the existing routing path to the particular node with the new routing path based on the comparison between the new sequence number and the existing sequence number.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, a "Border Router/Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Border Router/Root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. In some embodiments, network 100 may include a plurality of Border Routers/Root nodes that form a backbone of border routers to which nodes 11-45 etc. may join for routing purposes. Those skilled in the art will understand that any number of nodes, devices, links, etc. may be used in the computer network, and that the view shown herein is for simplicity. Also, those skilled in the art will further understand that while the network is shown in a certain orientation, particularly with a "Border Router/Root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
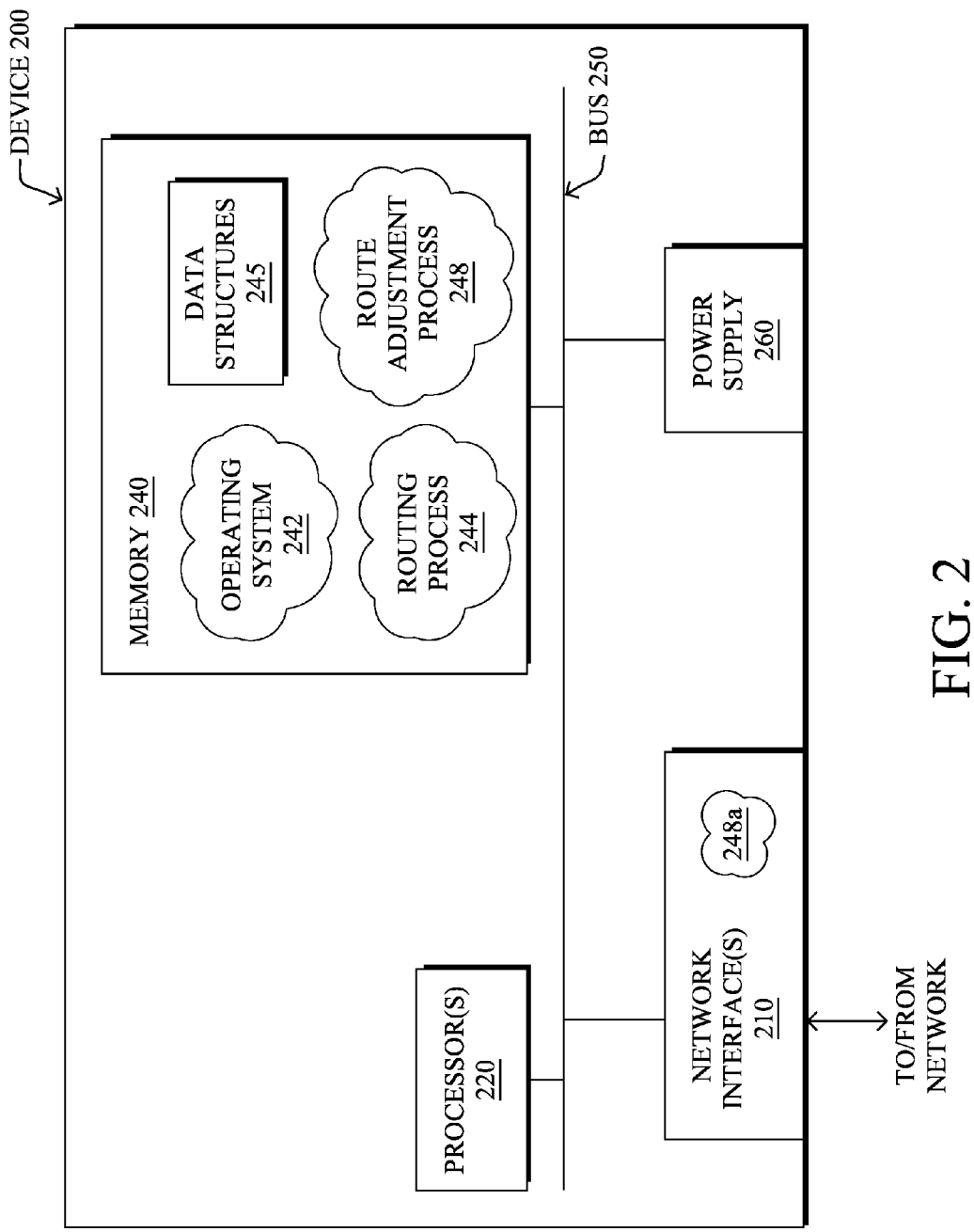
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and/or an illustrative route adjustment process 248, as described herein. Note that while route adjustment process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In some cases, routing process 244 may support the use of the Internet Protocol (IP) version 6 (v6) within a wireless personal area network (WPAN), such as those formed using 802.15.4 wireless links between devices/nodes. For example, routing process 244 may support the IPv6 Over Low Power WPAN (6LoWPAN) Protocol specified in the Internet Engineering Task Force (IETF) Request for Comment (RFC) 6282 entitled, "Compression Format for IPv6 Datagrams over IEEE 802.15.4-Based Networks," by Hui, et al. (September 2011). The IETF RFC 6775 entitled, "Neighbor Discovery Optimization for IPv6 over Low-Power Wireless Personal Area Networks (6LoWPANs)," by Shelby et al. (November 2012) provides neighbor discovery techniques that routing process 244 may also use to form a 6LoWPAN.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an IETF Proposed Standard, RFC 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
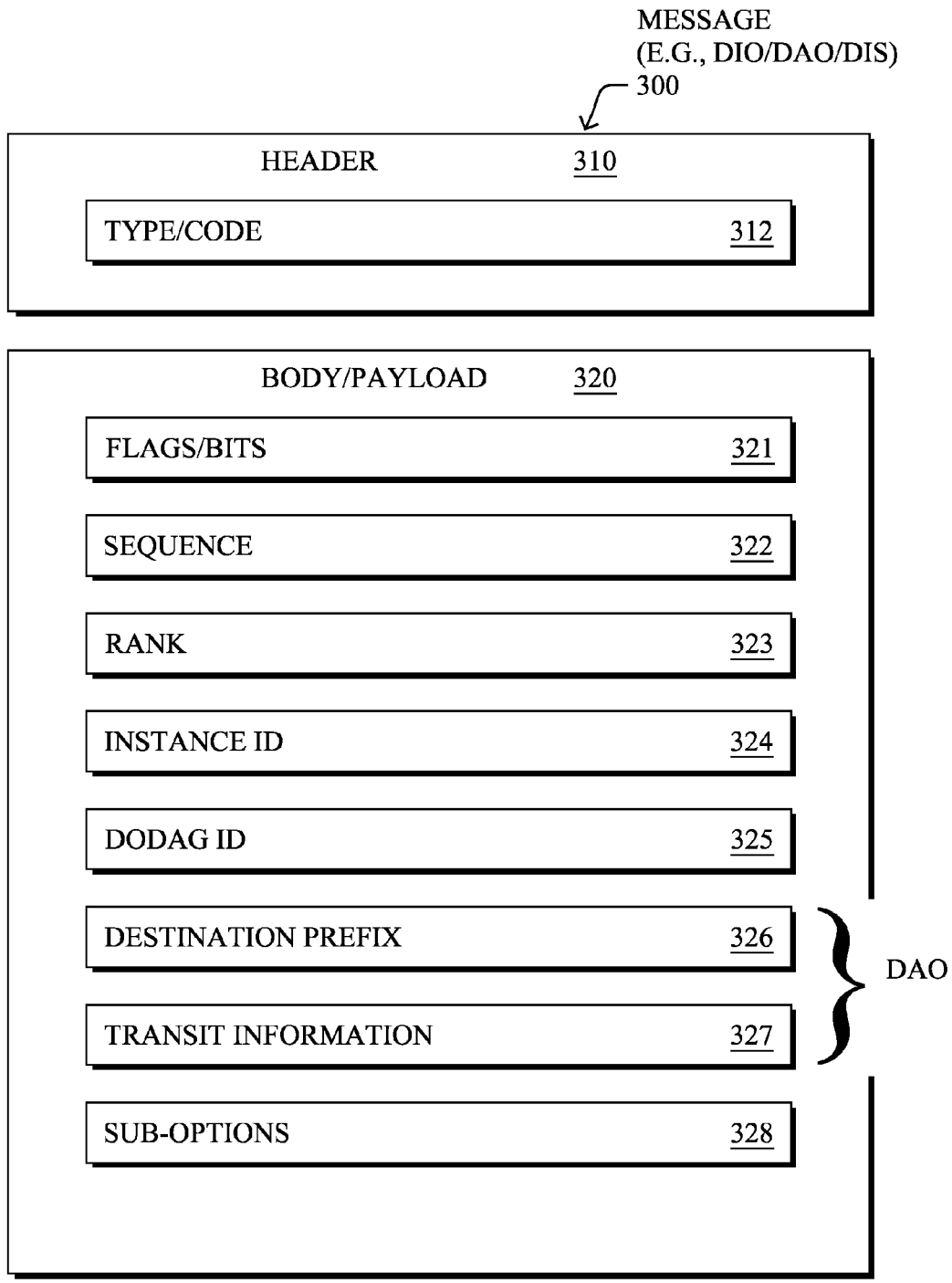
FIG. 3 illustrates an example routing protocol message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
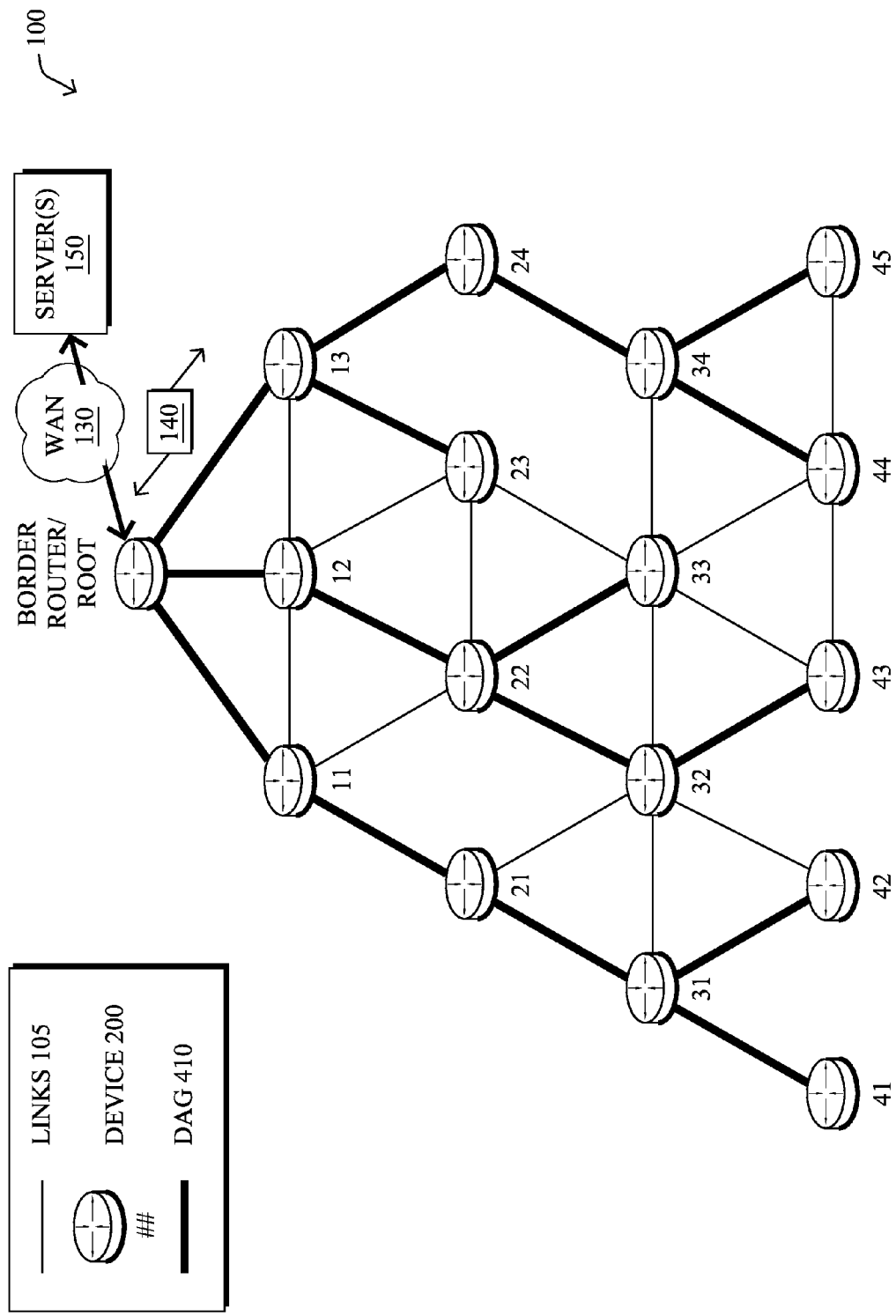
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, supporting device mobility in mesh networks, such as LLNs, is challenging due to the various constraints on the links and devices in the network. To support device mobility, RPL requires that when a device moves from potential parents, the new route to the device be established through the use of routing protocol messages (e.g., DAOs, etc.) that are sent out after expiration of a timer. Thus, routing updates due to the movement of a device may only be effected periodically, so as to limit the impact of routing messages on the performance of the network. In addition, doing so may also take a certain amount of time before the new path is established in the network, due to the resource constraints on the devices and the low bandwidth links between the devices. In the meantime, packets sent from the Border Router/Root to the moving node may be lost. In other words, data packets sent to a moving node in the LLN may be relatively slow in reaching the node and may be routed along a dead-end path as the new path is formed down the DODAG.

Device Mobility in a Mesh Network

The techniques herein provide a lightweight mechanism to facilitate local device mobility within a mesh network without adding costly message exchanges and also preserving data flows within the network. In some aspects, the techniques herein provide a make before break mechanism that deprecates a path, yet ensures that the residual packets on the way to a node via the path to be deprecated are still delivered. Once all packets have been delivered, the deprecated path may be cleaned up from the routing topology of the network. In further aspects, techniques are introduced herein that allow for the reduction of messages to the Border Router/Root sent in response to a requested parent change by a node, thereby allowing for faster device roaming in the network and reducing network traffic.

Specifically, according to one or more embodiments of the disclosure as described in detail below, a device in a network receives a notification from a neighbor of the device indicative of a child node of the device requesting a parent change from the device to the neighbor. The device updates an existing routing path from the device to the child node to be routed through the neighbor, in response to receiving the notification from the neighbor. The device receives an instruction to remove the updated routing path from the device to the child node through the neighbor. The device removes the updated routing path from the device to the child node, in response to receiving the instruction to remove the updated routing path.

Illustratively, the techniques described herein may be performed by hardware, software, and/or firmware, such as in accordance with the route adjustment process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Figure 5A:
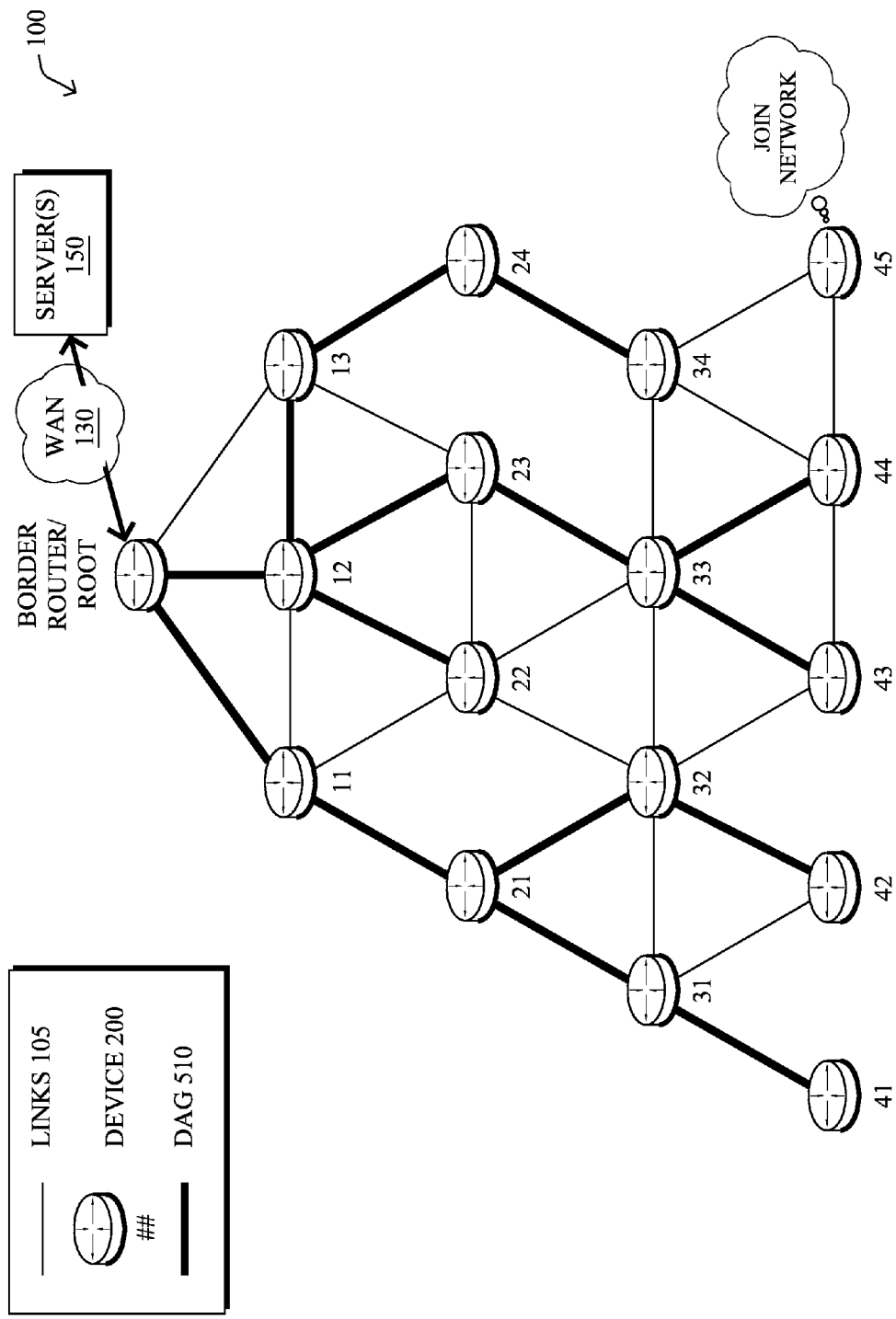
FIGS. 5A-5G illustrate an example of a device/node joining a network.

Operationally, an example of a node/device joining a network is shown in FIGS. 5A-5G, according to various embodiments. In some cases, a node joining the network may first select a nearby node/router as its parent. For example, as shown in FIG. 5A, assume that node 45 is not joined to network 100, but is within communication range of both nodes 34 and 44. In such a case, node 45 may determine that node 45 should join network 100, in response to discovering either or both of nodes 34 and 44.

Figure 5B:
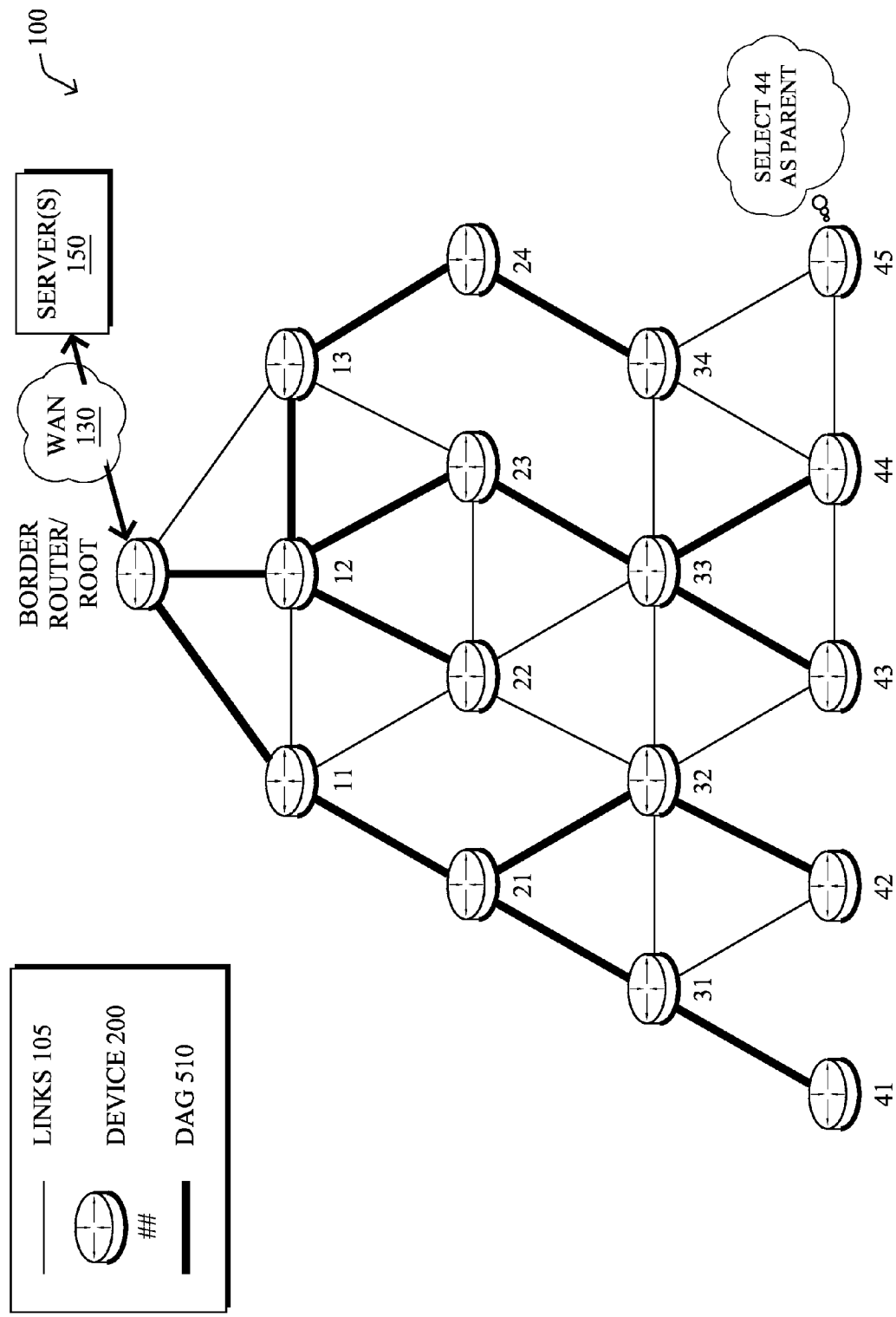

As part of the network join process, a joining node may select a node already in the network that is in communication range of the joining node to be its parent node. For example, as shown in FIG. 5B, node 45 may select either of nodes 34 and 44 as its parent node within network 100. In some cases, node 45 may base its parent selection on one or more objective functions. For example, node 45 may select node 44 as its parent based on the link quality between nodes 44 and 45 being greater than that of the link between nodes 34 and 45. In other cases, node 45 may select the first node that it discovers in network 100 as its parent.

Figure 5C:
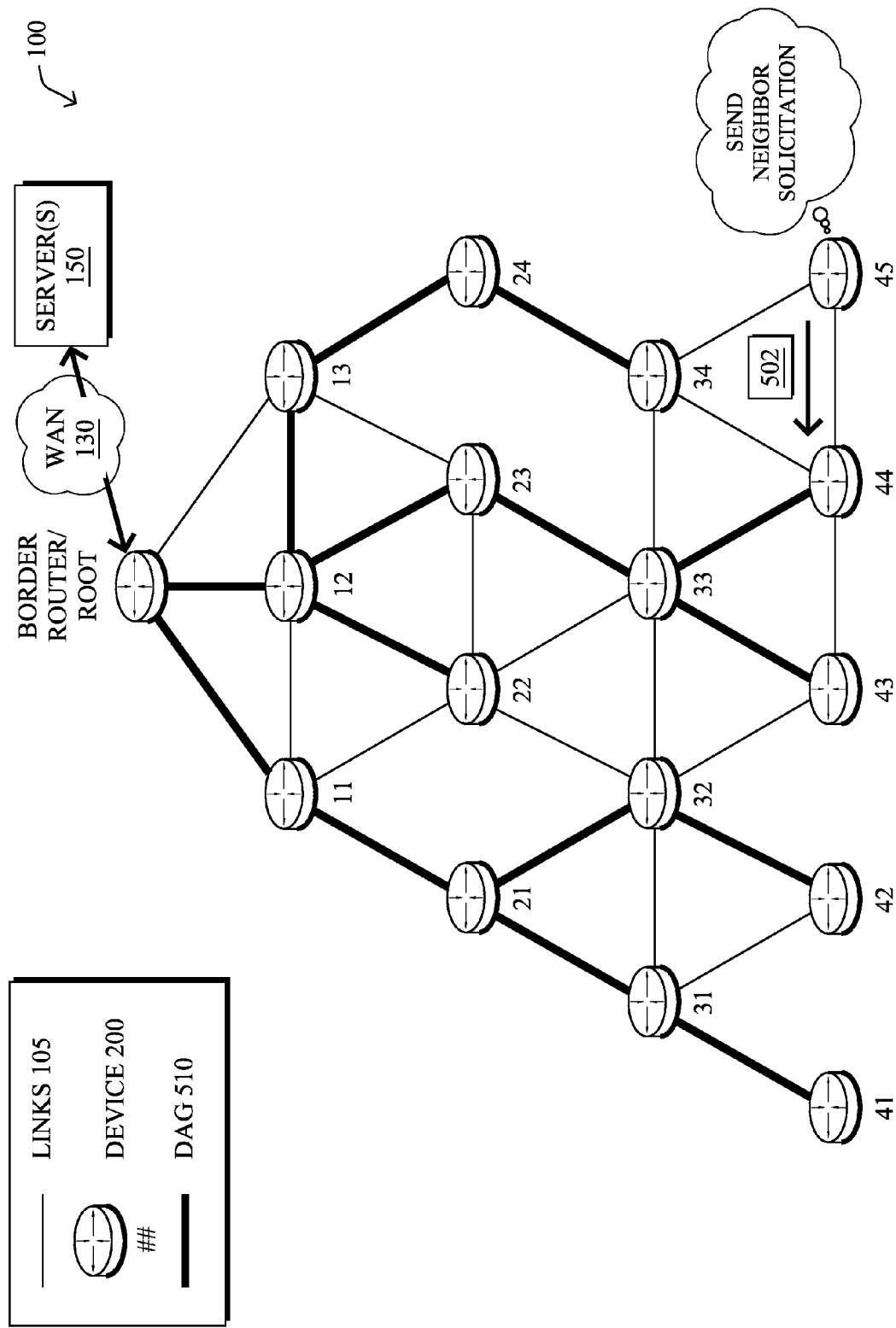

A joining node may send a neighbor solicitation message to its selected parent, to initiate the network join process. For example, as shown in FIG. 5C, node 45 may send a neighbor solicitation message 502 to its selected parent, node 44. In one embodiment, neighbor solicitation message 502 may be a 6LoWPAN neighbor discovery message. Message 502 may, for example, be used to initiate a number of operations in network 100 such as adding node 45 to network 100, installing one or more routing paths to and/or from node 45, ensuring that the address of node 45 does not already exist in network 100, or other such functions.

Figure 5D:
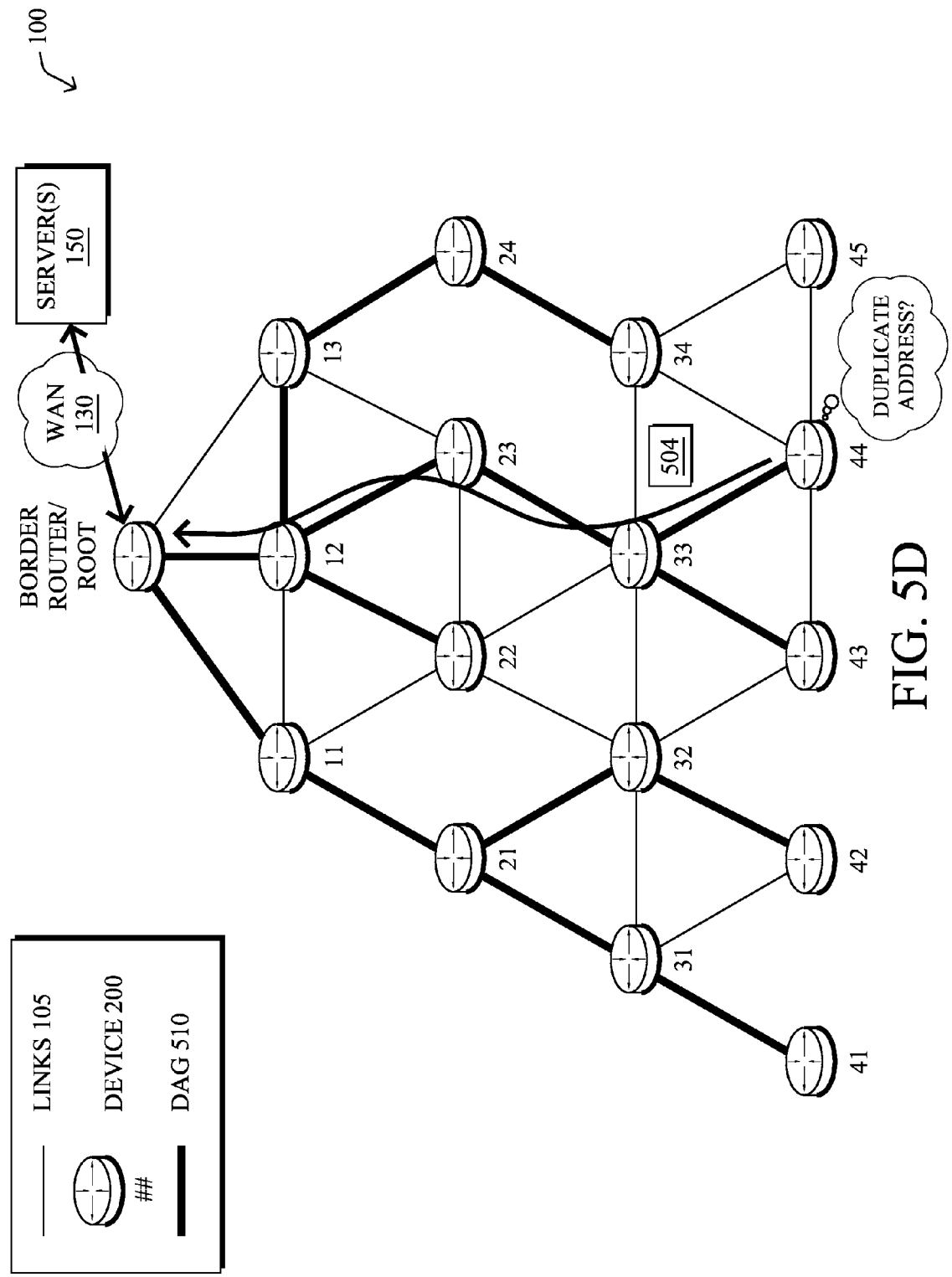

Duplicate address detection in network 100 may proceed as follows. First, node 45 may include its address in neighbor solicitation message 502 sent to node 44. For example, neighbor solicitation message 502 may include the address of node 45 in a 6LoWPAN address registration option (ARO). In response to receiving neighbor solicitation message 502, node 44 may attempt to determine whether the address identified by message 502 is already in use within network 100. For example, as shown in FIG. 5D, node 44 may forward the address indicated in message 502 to the Border Router/Root (e.g., a 6LoWPAN Border Router (6LBR)) in a duplicate address request (DAR) message 504.

Figure 5E:
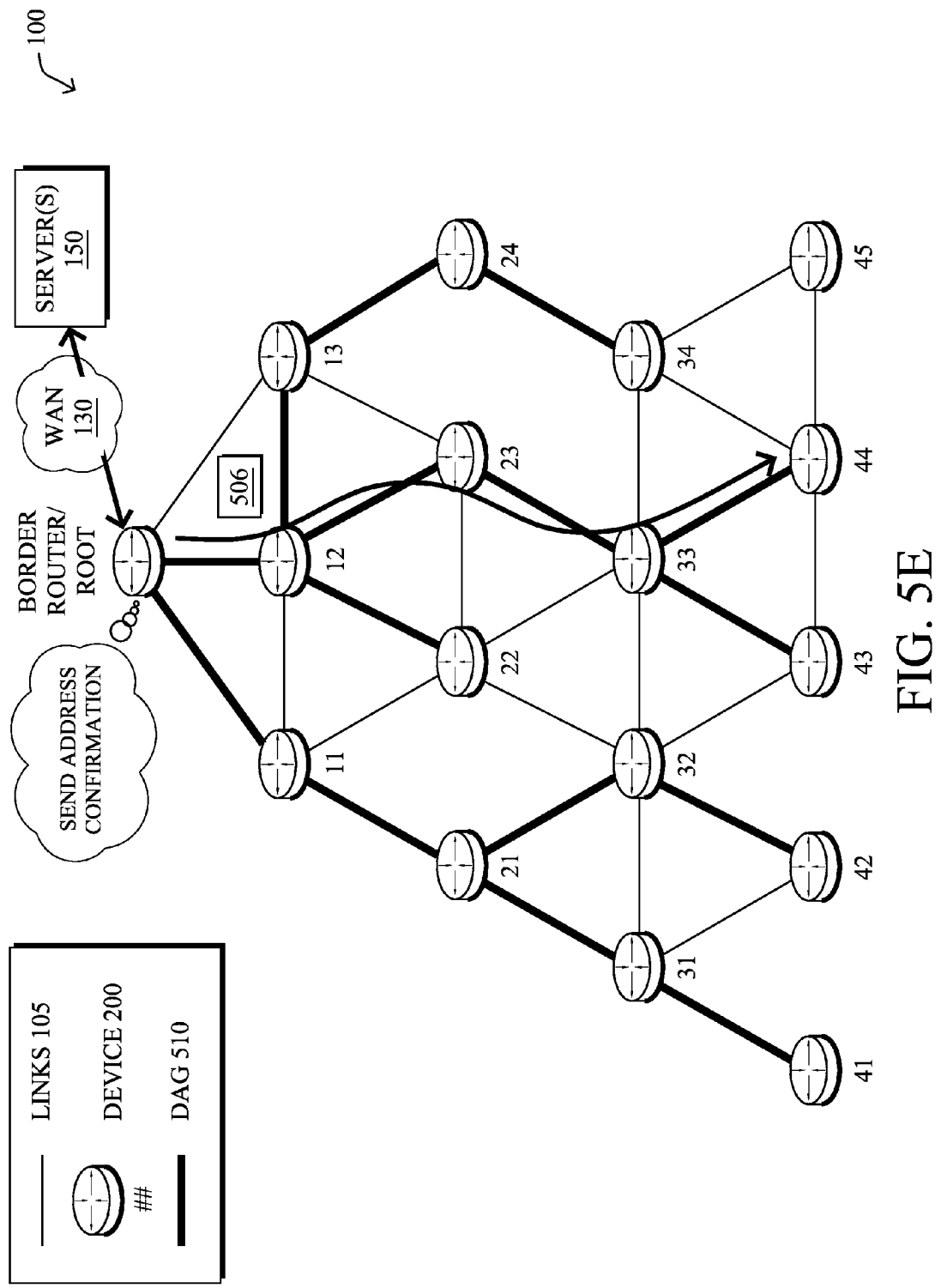

In response to receiving DAR message 504, the Border Router may determine whether the indicated address of node 45 is already in use within network 100. As shown in FIG. 5E, the Border Router may then send an address confirmation message 506 indicative of the determination back to node 44. For example, address confirmation message 506 may be a 6LoWPAN duplicate address confirmation (DAC) message that indicates whether the address of node 45 is valid or is a duplicate address.

In some embodiments, the Border Router may generate a self-signed certificate that indicates that the address of node 45 is valid and now registered in network 100, in response to receiving DAR message 504. Such a certificate may also indicate an associated registration lifetime for the address of node 45. In some embodiments, the Border Router may include the signed certificate and/or registration lifetime in address confirmation message 506 sent back to node 44. In turn, node 44 may use this certificate later on to facilitate a subsequent parent change/movement of node 45 within network 100. For example, any of the nodes 11-45 in network 100 that are capable of acting as a parent node may store the appropriate keys needed to validate address confirmation certificates issued by the Border Router/Root node and use the certificate stored at node 44 to validate the address of node 45, instead of querying the Border Router/Root node.

Figure 5F:
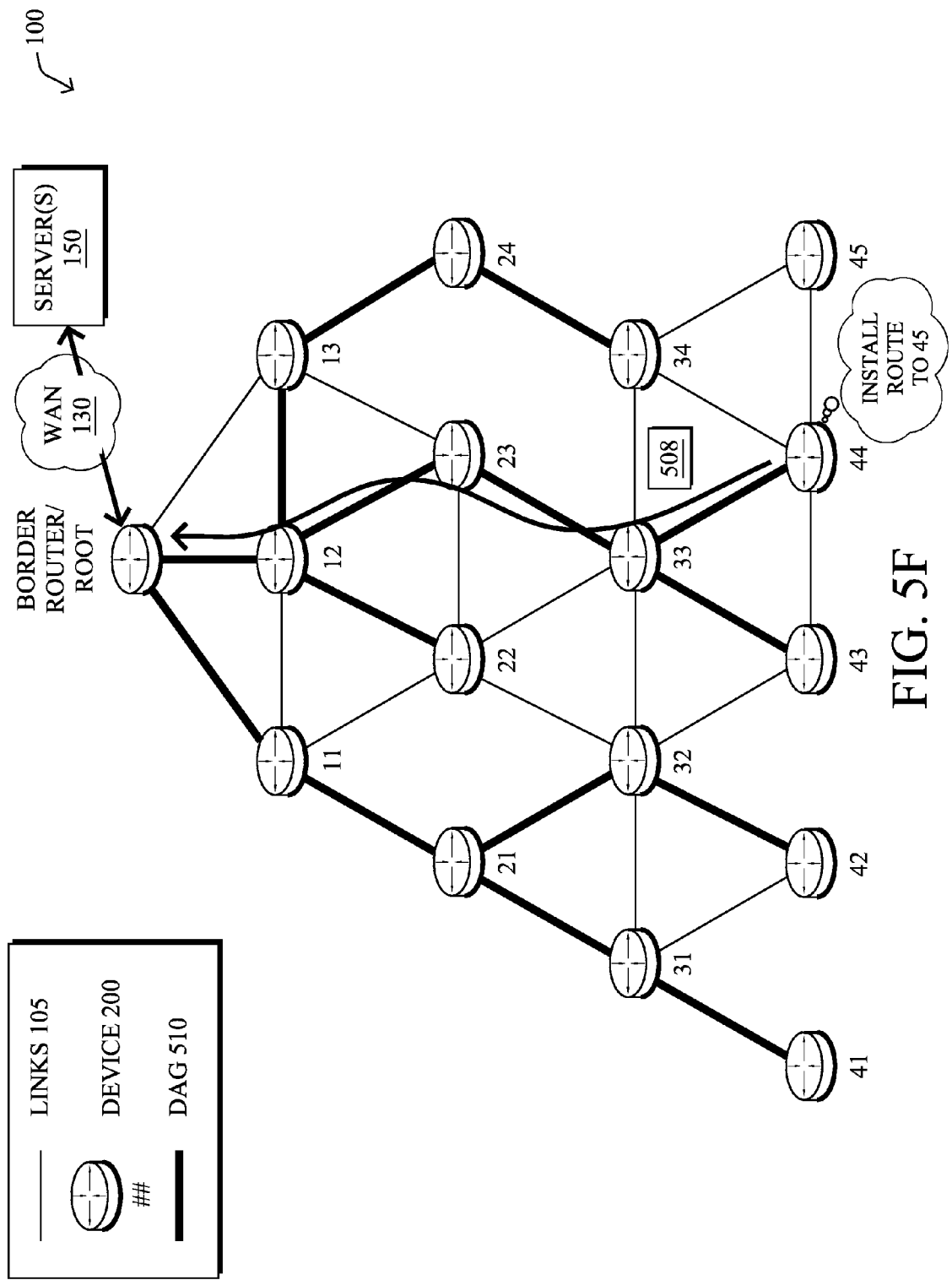
Figure 5G:
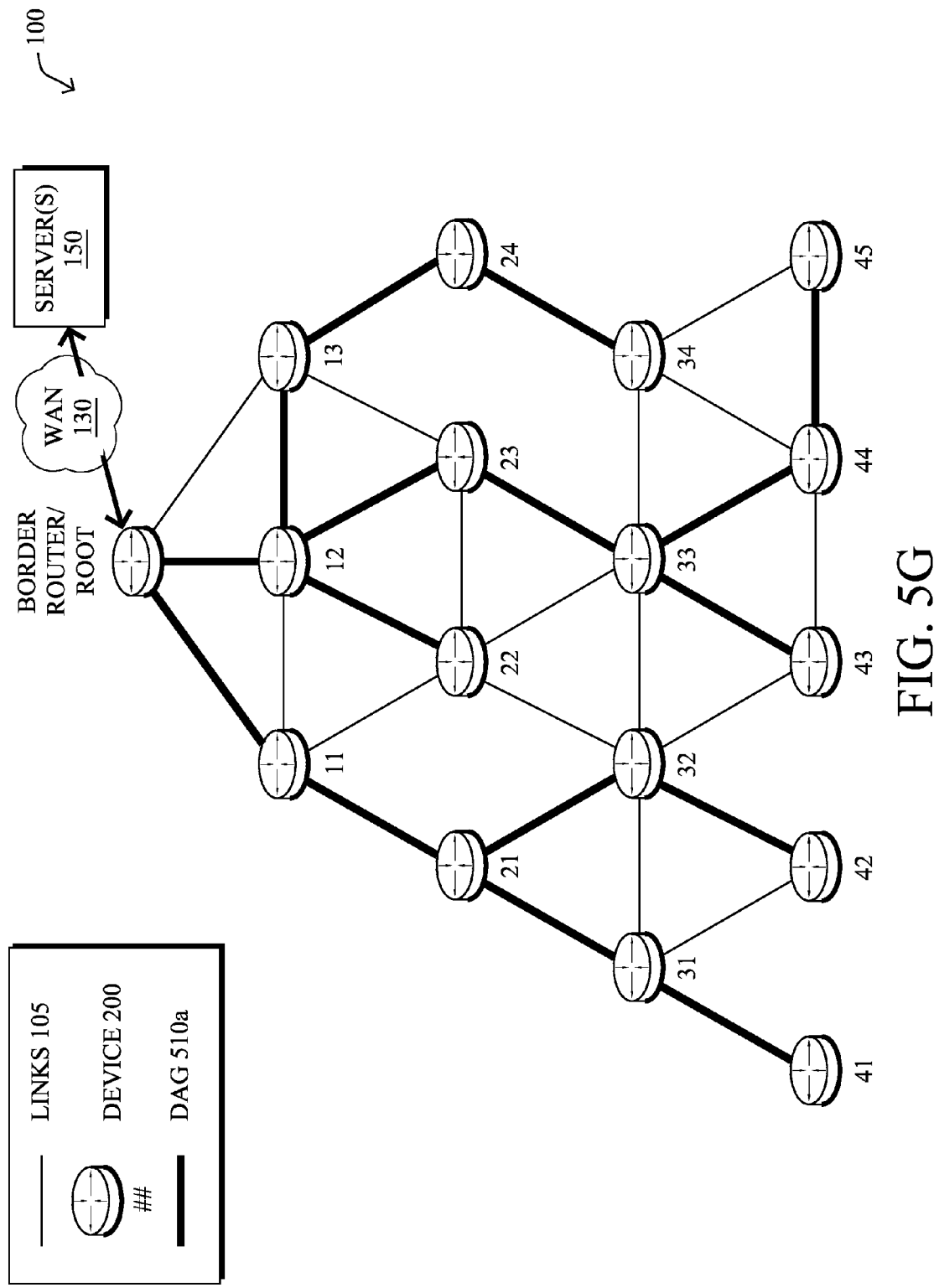

In addition to validating the address of node 45, the network join process may entail establishing one or more routing paths between node 45 and the Border Router/Root node. For example, as shown in FIG. 5F, node 44 may send a routing protocol message 508 (e.g., a DAO message) upstream towards the Border Router/Root node, to update DAG 510 to include a routing path from the Root to node 45. In other embodiments, node 45 may itself be enabled to issue routing protocol message 508 (e.g., as opposed to node 44 initiating the routing update), if node 45 also supports the routing protocol (e.g., RPL, etc.). As described in greater detail above, the intermediary devices between node 44 and the Border Router/Root node that receive routing protocol message 508 may set up the route to node 45, thereby leading to the updated DAG 510a shown in FIG. 5G. As shown, DAG 510 has been updated by issuance of routing protocol message 508 to include a routing path from the Border Router/Root node to node 45 that traverses node 44 as the parent of node 45.

In various embodiments, node 45 may generate a sequence number when joining network 100 and include the sequence number in neighbor solicitation message 502 sent to node 44. In one embodiment, neighbor solicitation message 502 may use a 6LoWPAN extended ARO option to indicate the generated sequence number. For example, neighbor solicitation message 502 may set a TID parameter in neighbor solicitation message 502, to indicate the generated sequence number to node 44.

The sequence number generated by node 45 as part of the network join process may also be included in routing protocol message 508. For example, node 44 may include the sequence number indicated by neighbor solicitation message 502 in the corresponding DAO or other routing protocol message used to establish a routing path to node 45. Alternatively, if node 45 issues routing protocol message 508 directly, node 45 may include the sequence number in routing protocol message 508. During installation of the routing path to node 45, each router/node that receives routing protocol message 508 may store the sequence number associated with node 45, to facilitate removal of the routing path at a later time (e.g., due to movement of node 45 and/or a parent change initiated by node 45).

Figure 6A:
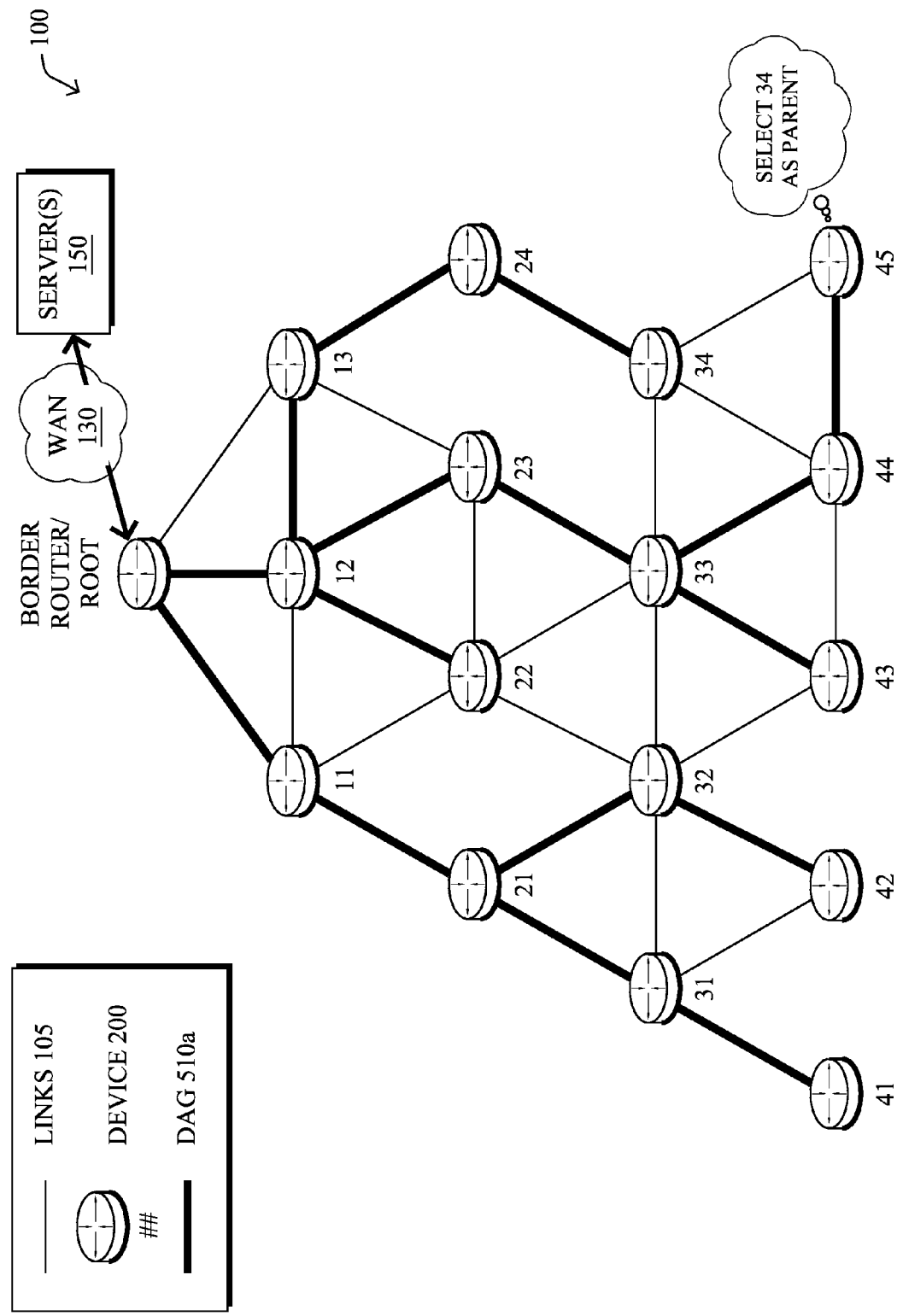
FIGS. 6A-6I illustrate an example of a device/node changing parents in a network.

Referring now to FIGS. 6A-6I, an example is illustrated of a device/node changing parents in a network. Continuing the examples of FIGS. 5A-5G, assume that node 45 has joined network 100 using node 44 as its parent in DAG 510a. At some point in time thereafter, node 45 may select a different node as its parent than its current parent, node 44. For example, as shown in FIG. 6A, node 45 may determine that it should switch parents from node 44 to node 34. In some cases, node 45 may physically move to a different location, thereby necessitating the parent change to node 34. In another example, changing network or environmental conditions may necessitate the parent change to node 34, without node 45 moving physically. For example, node 44 may become unreachable to node 45, the link between node 34 and node 45 may offer better characteristics than that of the link between node 44 and 45 according to an objective function, etc. In other words, in some cases, node 45 may make an intelligent parent selection should node 34 advertise its visible neighbor routers (e.g., via router advertisement messages, etc.).

Figure 6B:
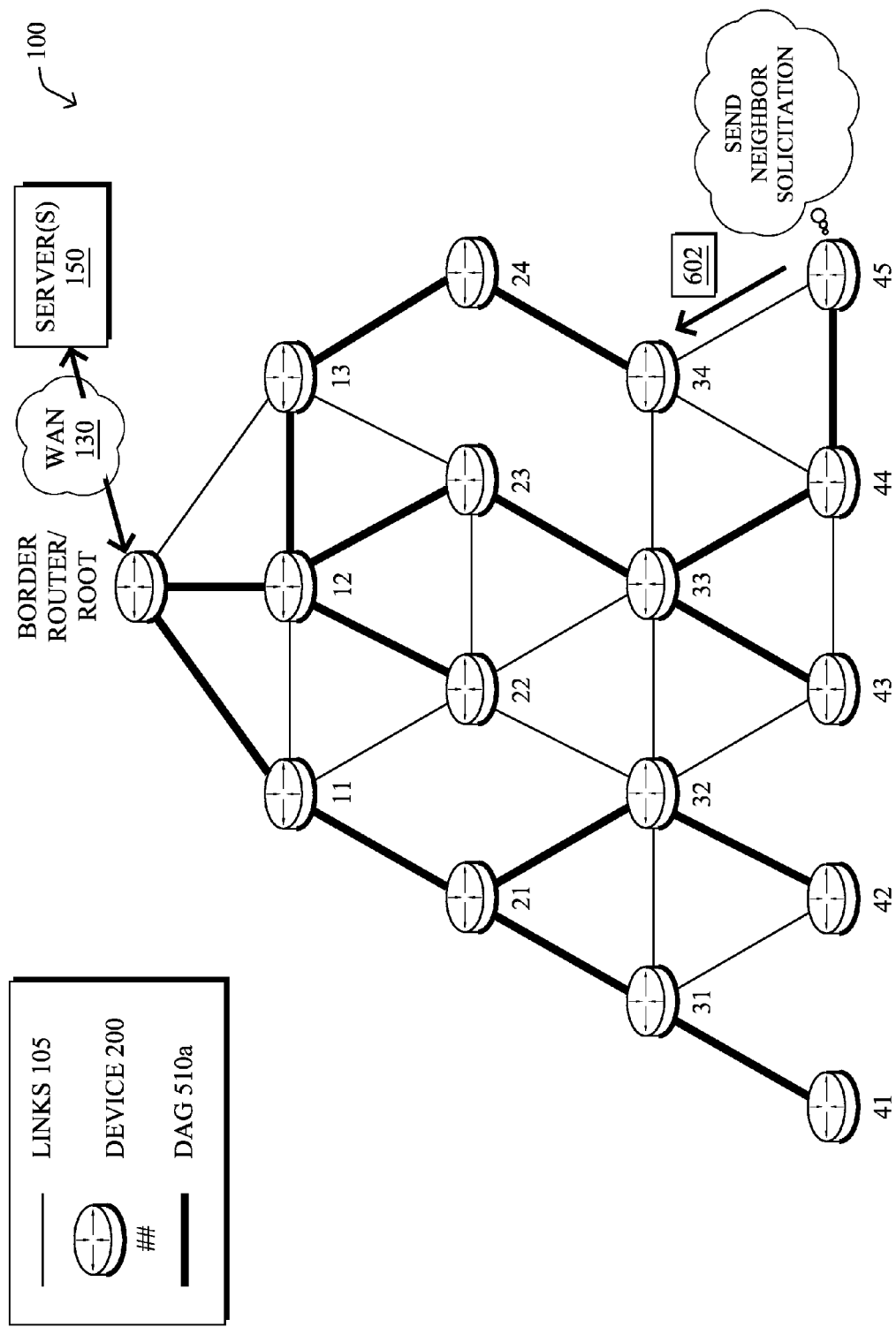

To initiate the changeover from an existing parent node to a new parent node, a child may send a new neighbor solicitation message to the new parent node. For example, as shown in FIG. 6B, node 45 may initiate the parent change to node 34 by sending a neighbor solicitation message 602 to node 34. Similar to neighbor solicitation message 502, neighbor solicitation message 602 may indicate the address of node 45 (e.g., for purposes of ensuring that the address is not a duplicate address in the network). In addition, node 45 may generate a new sequence number and include the new sequence number in neighbor solicitation message 602 to node 34. In various embodiments, neighbor solicitation message 602 may also identify node 44 as the parent of node 45 away from which node 45 is switching.

Figure 6C:
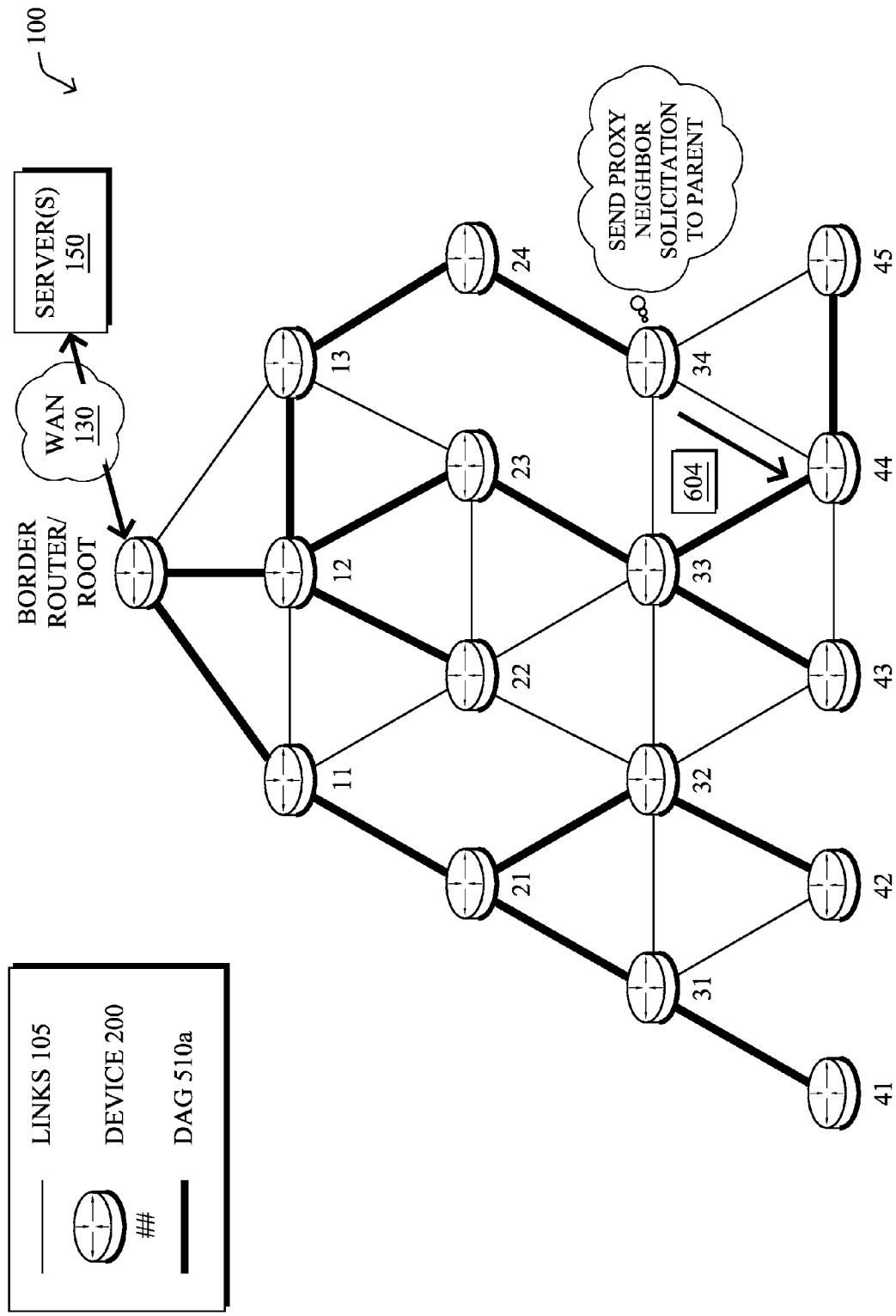

In response to receiving a neighbor solicitation message that requests a parent change, the new parent may notify the existing parent of the requested parent change. In various embodiments, both the existing and new parent nodes may be neighbors within direction communication range of one another. For example, as shown in FIG. 6C, node 34 may send a proxy neighbor solicitation message 604 to node 44 that is based on neighbor solicitation message 602, to notify node 44 of the requested parent change. In some embodiments, proxy neighbor solicitation message 604 may include the new sequence number from neighbor solicitation message 602 received from node 45. In another embodiment, proxy neighbor solicitation message 604 may indicate the address of node 45 for purposes of validating the address.

Figure 6D:
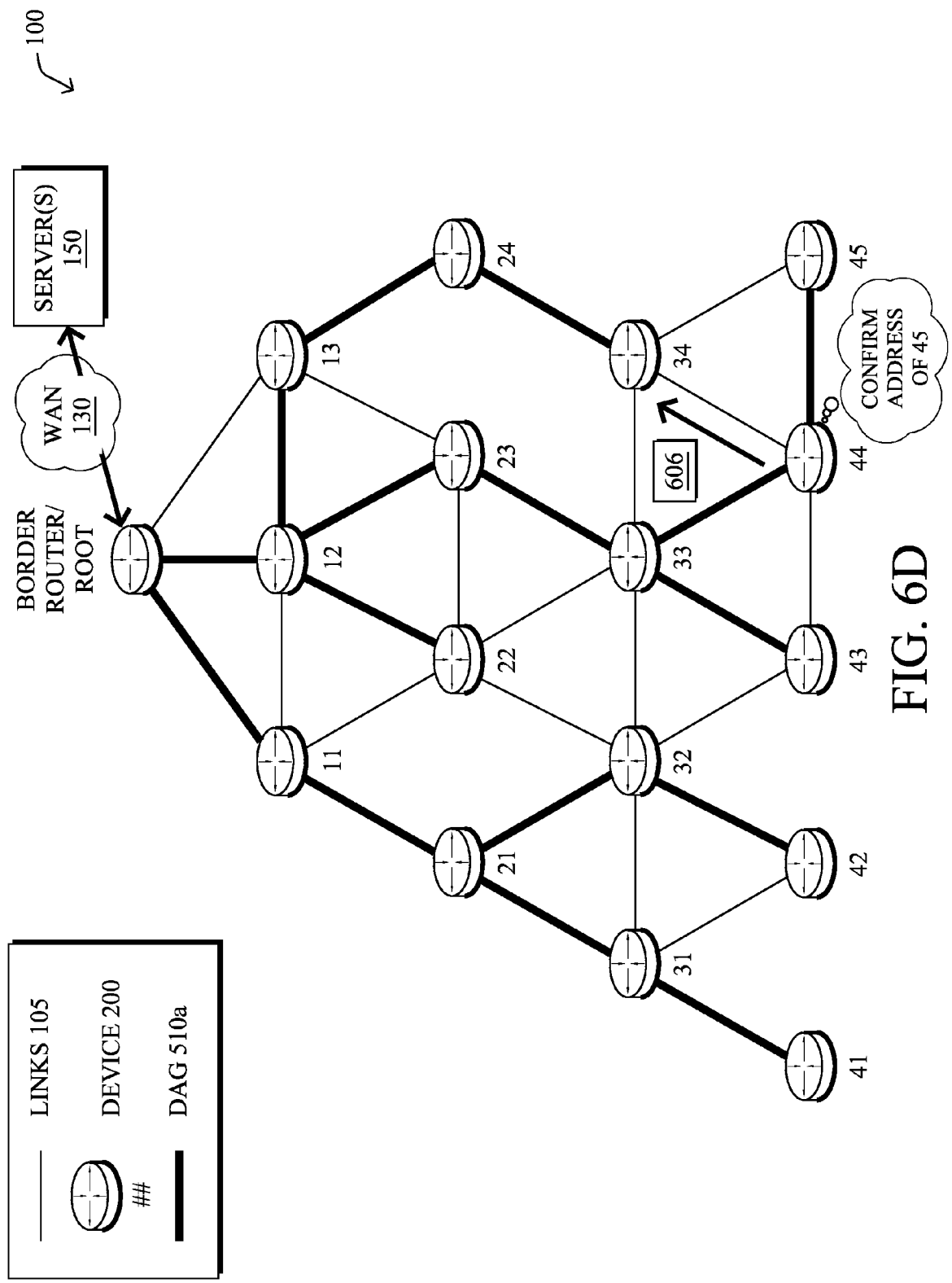

In one embodiment, node 44 may perform address validation of the address of node 45. For example, as noted above, node 44 may maintain a signed certificate from the Border Router/Root node that certifies that the address of node 45 is not duplicative within network 100. As shown in FIG. 6D, in response to receiving the proxy neighbor solicitation message 604 from node 34 that indicates the address of node 45, node 44 may send an address confirmation message 606 to node 34 indicating whether the address of node 45 is valid. For example, address confirmation message 606 may include the signed certificate and/or the registration date or timespan for the address, thereby indicating to node 34 that the address of node 45 is not a duplicate address. Node 34 may then use its installed keys on the certificate to verify that the address is valid. In doing so, node 34 may avoid sending a DAR message to the Border Router/Root. Thus, by node 34 using neighboring node 44 for purposes of performing address validation of the address of node 45 instead of initiating a DAR/DAC exchange with the Border Router/Root node, the amount of traffic generated in network 100 resulting from the parent change may be reduced. In addition, latency in the parent change process may be reduced by using node 44 for the address validation, since nodes 34 and 44 are neighbors.

Figure 6E:
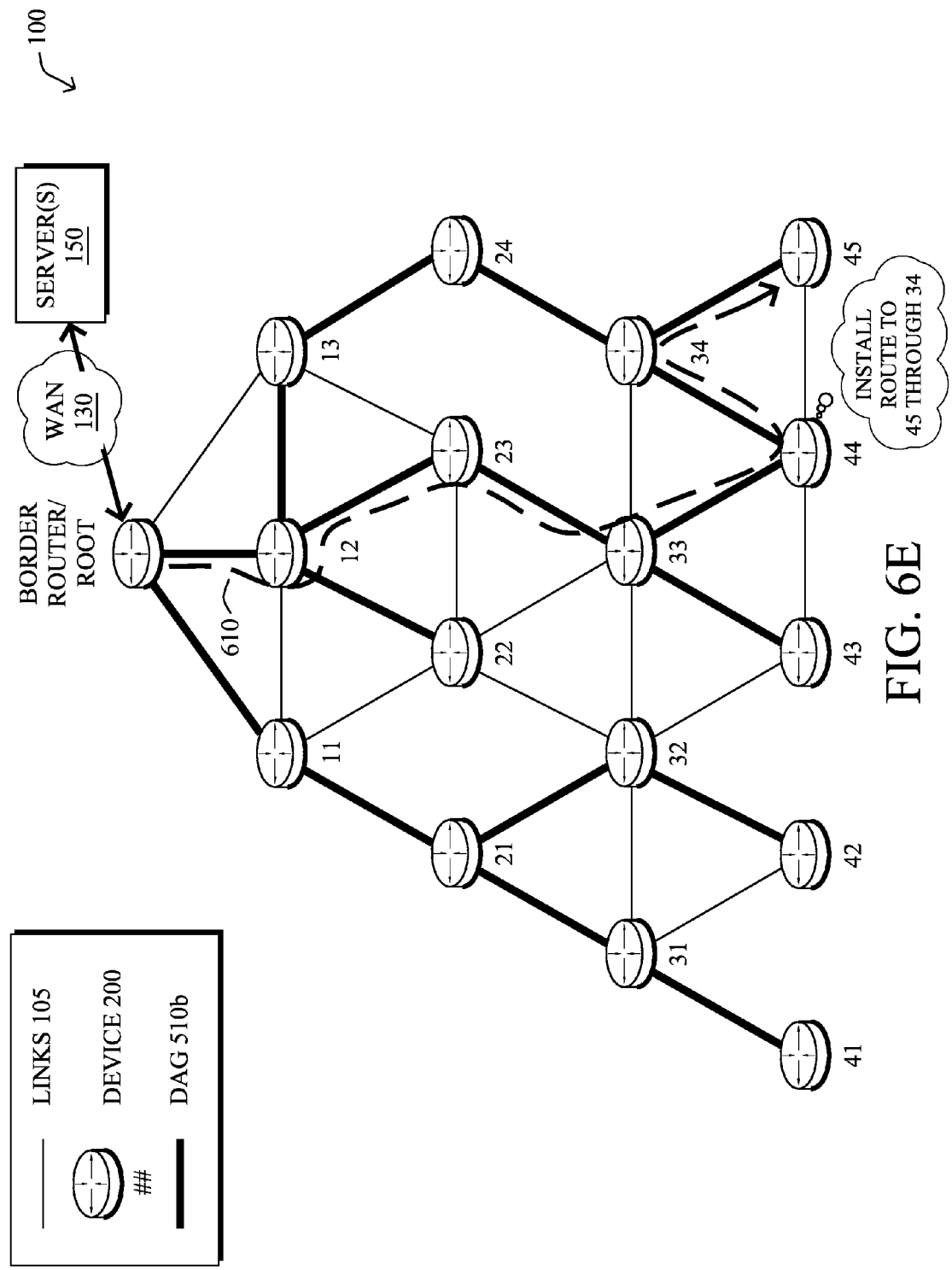

In response to receiving a proxy neighbor solicitation message indicative of a request by a child node to change parents, the existing parent node may update the existing routing path to the child to extend through the new parent. For example, as shown in FIG. 6E, in response to receiving proxy neighbor solicitation message 602 from node 34, node 44 may update the existing routing path from node 44 to node 45 to instead extend through node 34. In other words, DAG 510a may be updated to form the graph 510b shown that includes routing path 610 that extends from the Border Router/Root node to node 45 via nodes 44 and 34. Any packets received by node 44 that are addressed to node 45 may then be forwarded to node 34 while the parent change from node 44 to node 34 completes. In some implementations, node 45 may not even be aware of the redirection of traffic by node 44, since all traffic that node 45 receives after initiating the parent change to node 34 will be received via node 34.

Figure 6F:
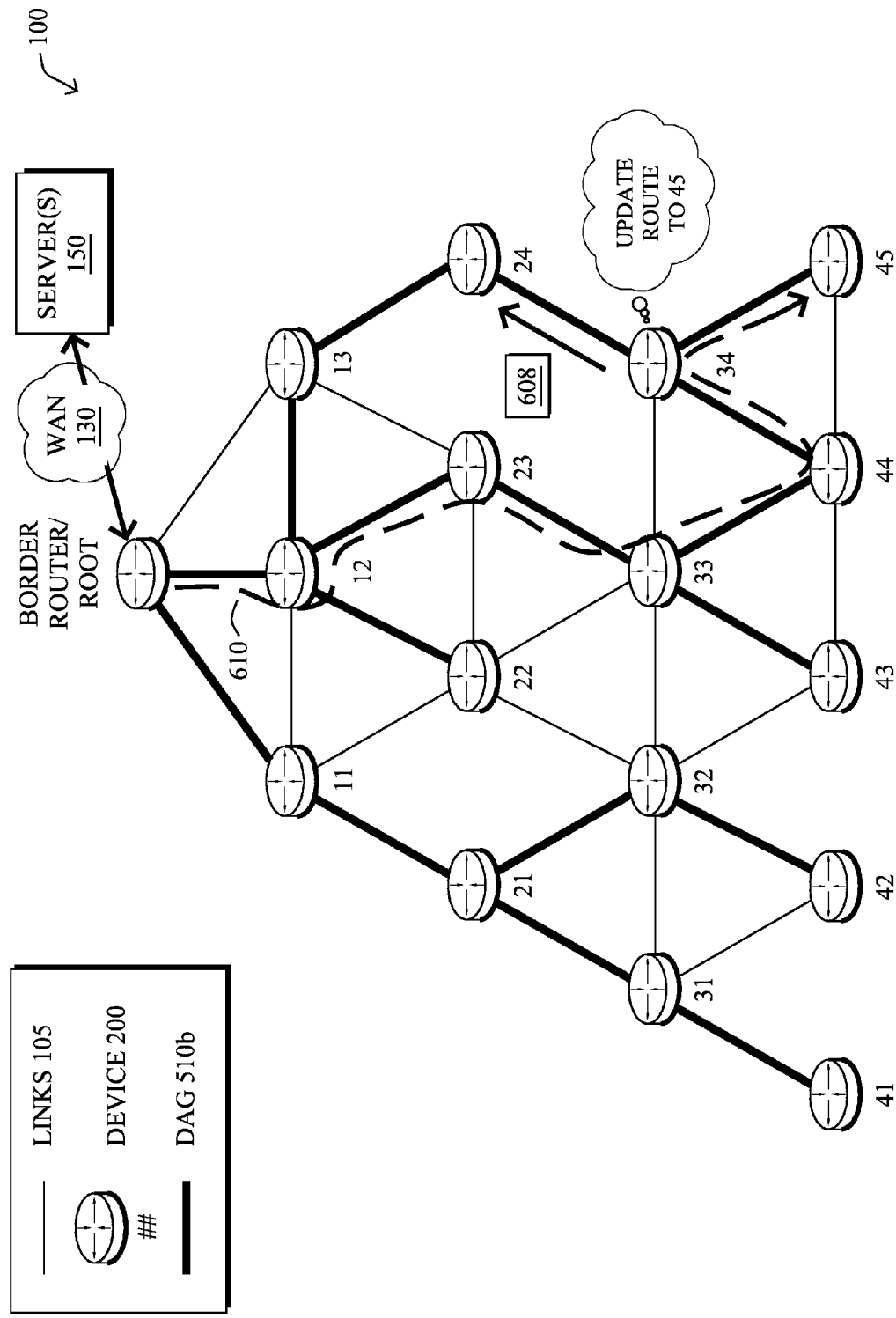

While traffic sent to node 45 via routing path 610 may still reach node 45, a better routing path from the Border Router/Root node to node 45 may exist after node 34 takes over as the parent of node 45. Thus, in some cases, the new parent node may initiate a routing update, to install a new routing path in the network. For example, as shown in FIG. 6F, node 34 may send routing protocol message 608 (e.g., a DAO message, etc.) upstream in network 100, to install a new routing path from the Border Router/Root node to node 45. Routing protocol message 608 may then percolate upstream in network 100, to install the new routing path to node 45 in network 100. In other cases, node 45 may send routing protocol message 608, if node 45 is configured to support the routing protocol (e.g., RPL, etc.).

Figure 6G:
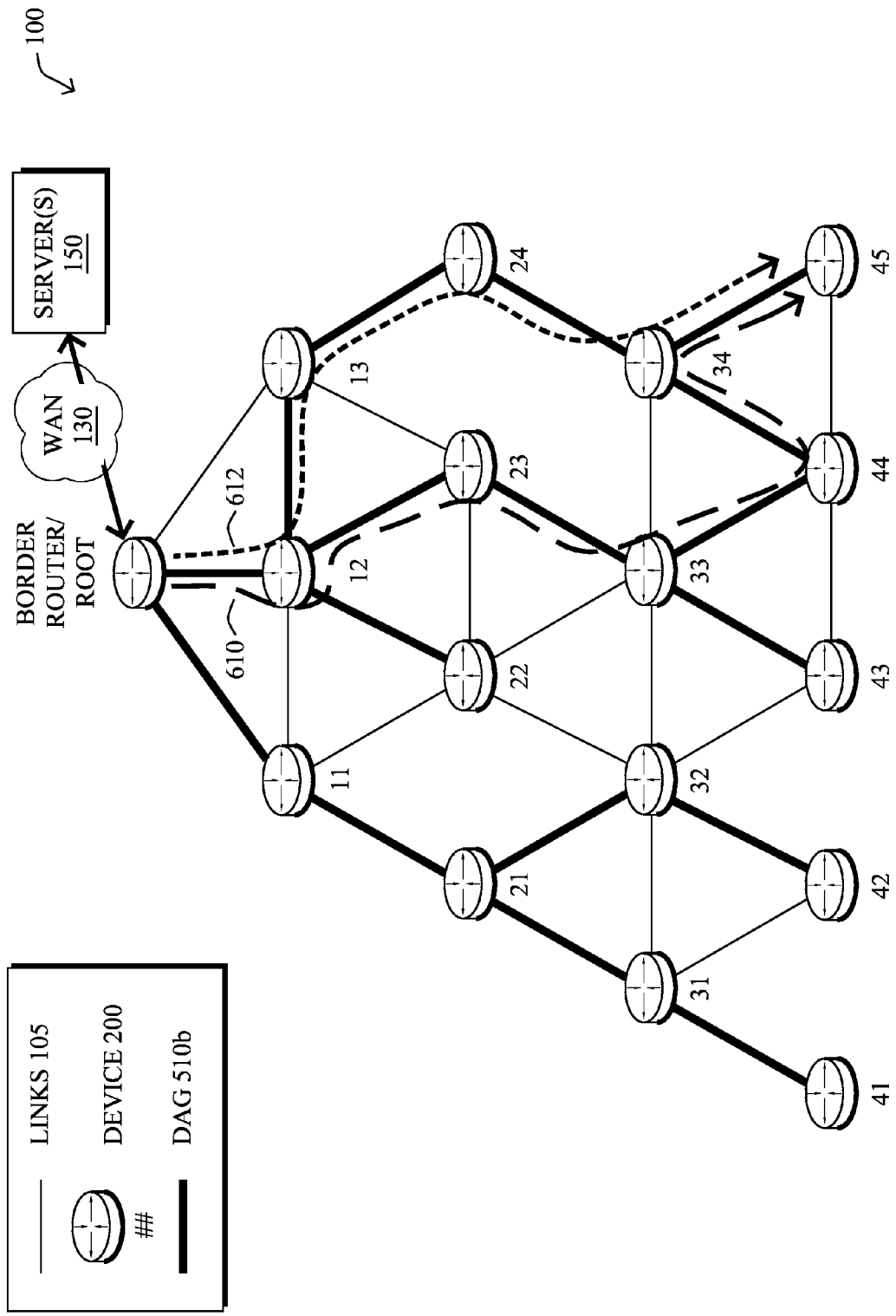

In various embodiments, a routing protocol message sent in response to a parent change may include the new sequence number generated by the child node as part of the parent change. Each node that receives the routing protocol message may then compare the new sequence number to any prior sequence numbers associated with the child node stored by the receiving node. For example, as shown in FIG. 6G, consider node 12, which is a common parent of the routes to both nodes 44 and 34. As noted previously, node 12 may maintain the older sequence number associated with node 45 and the corresponding routing path through node 44 that was included in routing protocol message 508 used to establish the original routing path to node 45 via node 44.

In response to receiving routing protocol message 608 that includes the new sequence number, node 12 may perform a comparison between the two sequence numbers to determine that a route change to node 45 is needed. Based on the comparison between the sequence numbers from routing protocol messages 508 and 608, node 12 may remove/uninstall the existing routing path 610 associated with the older sequence number. Node 12 may then begin forwarding packets addressed to node 45 via the new routing path 612 formed as a result of routing protocol message 608. In doing so, the parent change from node 44 to node 34 by node 45 may be considered to be complete, since routing path 612 provides the latest and greatest routing path from the Border Router/Root node to node 45 through node 34, the new parent of node 45. Thus, using routing path 610 until installation of routing path 612 is complete may ensure that packets continue to reach node 45 after initiation of the parent change.

Figure 6H:
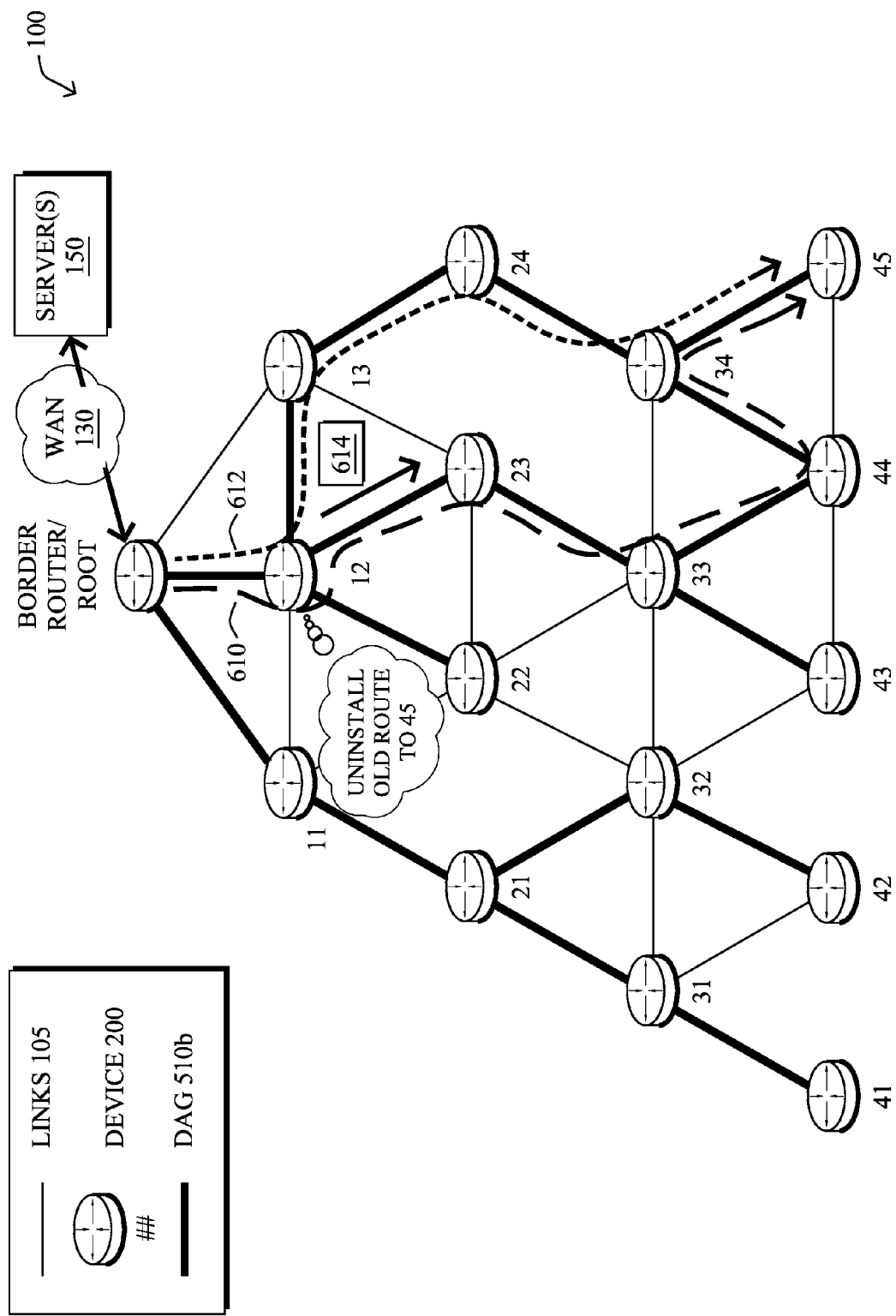

In various embodiments, a common parent node in both the old and new routing paths may cause the old routing path to be uninstalled in the network. For example, as shown in FIG. 6H, node 12 may send an instruction 614 along routing path 610 that causes the nodes along the path to uninstall routing path 610. In some embodiments, instruction 614 may be a no-DAO message and may include the new sequence number generated by node 45 and propagated in routing protocol message 608. Since each node along routing path 610 has already received the previous sequence number associated with node 45 via routing protocol message 508, each of nodes 23, 33, and 44 may perform a similar comparison between sequence numbers as that of node 12. Based on the comparisons, each node may then remove/uninstall path 610 to node 45 and propagate instruction 614 to the next hop along routing path 610. In one embodiment, instruction 614 may be sent at a lower or even the lowest packet priority used in network 100, to ensure that all packets on routing path 610 are sent to node 45 before cleaning up routing path 610.

Figure 6I:
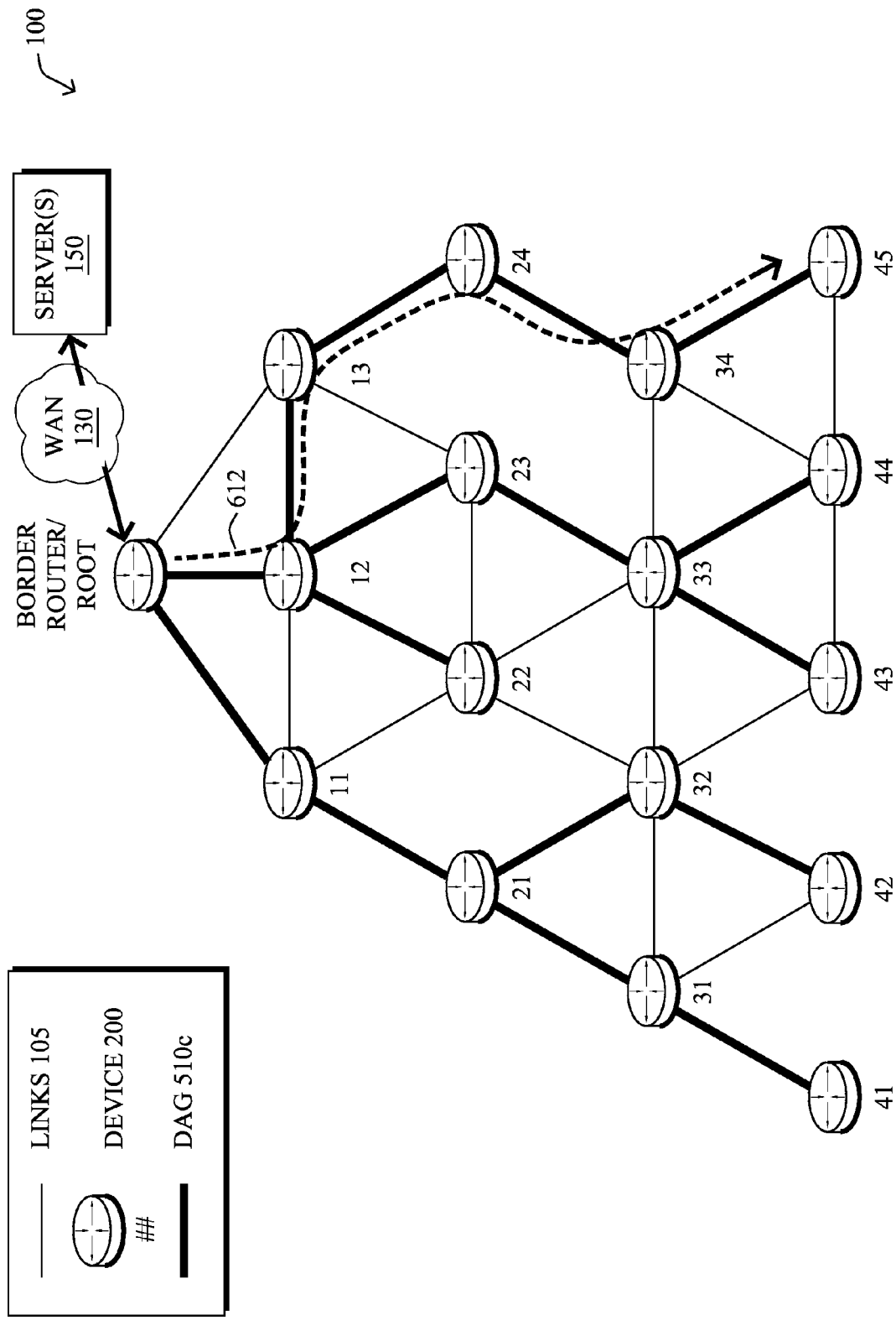

The uninstallation/removal of routing path 610 may continue until instruction 614 reaches a node with either no route to node 45 or the receiving node already has the new sequence number associated with node 45. For example, node 44 may already have the new sequence number associated with node 45 from the proxy neighbor solicitation message 602 received from node 34. When node 44 receives instruction 614, node 44 may remove the remainder of routing path 610 (e.g., by removing the route through node 34 to node 45) and cease the propagation of instruction 614 in network 100. At this point, the only routing path to node 45 is now routing path 612 through node 34, the new parent of node 45, thereby forming the updated DAG 510*c*, as shown in FIG. 6I.

Of note is that a node may only remove the routes associated with a sequence number older than the sequence number included in instruction 614. In doing so, even newer routing paths may be formed to the moving node, prior to cleanup of any previously installed routing paths. For example, assume that a node changes from a first parent to a second parent. In such a case, the existing path associated with the first parent will eventually be uninstalled using the techniques herein. However, if the node changes from the second parent to a third parent in the meantime, this may cause an even newer routing path/sequence number associated with the third parent to be installed at certain nodes. If such a node then receives the instruction to uninstall the routing path associated with the first parent, it may still preserve the routing paths associated with the second or third parents. In doing so, this ensures that packets are not lost during any of the parent transitions.

Figure 7:
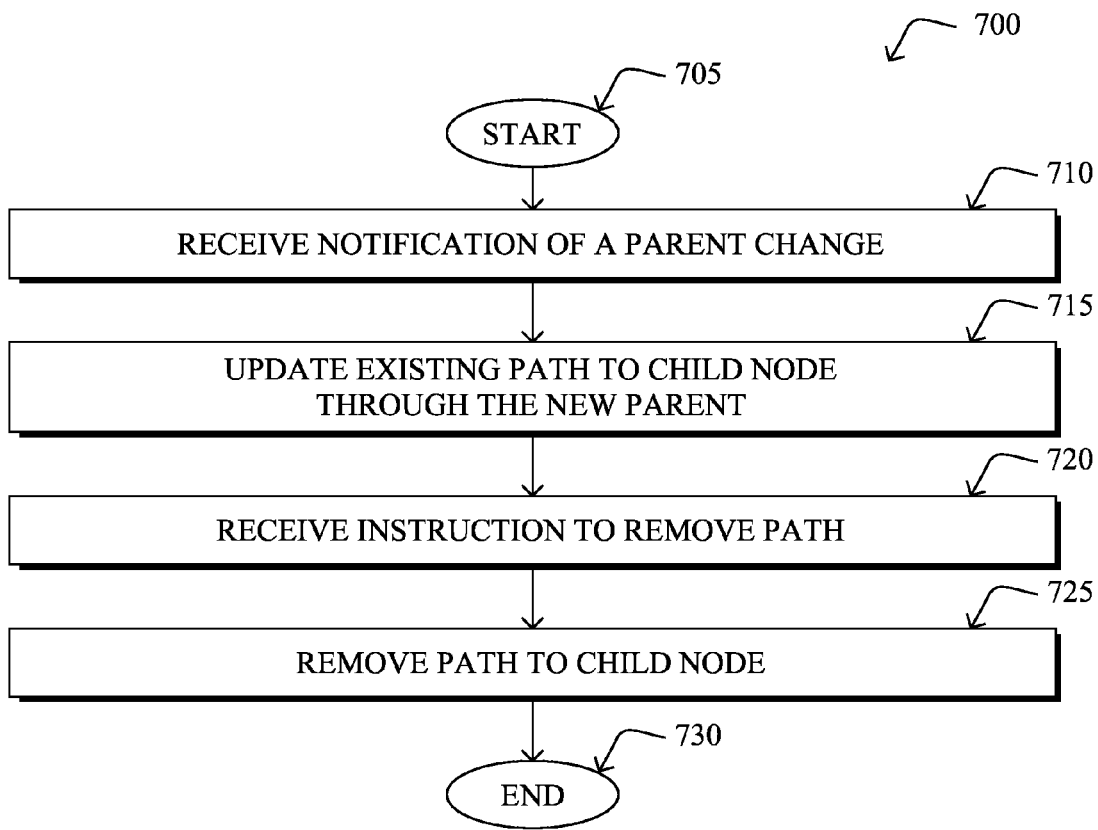
FIG. 7 illustrates an example simplified procedure for removing a path to a former child device/node.

FIG. 7 illustrates an example simplified procedure for removing a path to a former child device/node, according to the various techniques herein. Procedure 700 may be performed, in some embodiments, by any node/device (e.g., device 200) to which another node is attached as a child of the device. Procedure 700 begins at step 705 and continues on to step 710 where, as described in greater detail above, a device in a network may receive a notification that a child node of the device has requested a parent change away from the device. In various embodiments, the device may receive the notification from a neighbor of the device (e.g., another node/device within direct communication range of the device) that was selected as the new parent for the node. Such a notification may comprise, in one embodiment, a proxy neighbor solicitation message sent from the neighbor based on the neighbor solicitation message received by the neighbor from the child node to initiate the parent change. In another embodiment, the notification may include a sequence number generated by the child node as part of the parent change, to indicate its new parent association.

In some cases, the notification may also indicate the network address of the child node. In response to such an address, the device may validate the address, to ensure that the address is not a duplicate address. For example, the device may maintain a signed certificate that the device received from a border router/root node of the network as part of a dual address request (DAR)/dual address confirmation (DAC) exchange between the device and the border router/root. In turn, to confirm the validity of the address to the neighbor, the device may provide the signed certificate to the neighbor or any other indication regarding the validity of the address of the child node.

At step 715, the device may update the existing routing path to the child node to be routed through the neighbor, as described in greater detail above. In particular, in response to receiving the notification from the neighbor regarding the parent change, the device may begin routing packets directed to the child node through the neighbor/new parent of the child node. In other words, rather than attempting to send the packets directly to the child node, the device may instead send the packets indirectly to the child node through the new parent of the child node.

At step 720, as detailed above, the device may receive an instruction to remove the updated path to the child node. At some point in time after updating the routing path to the child node, for example, the device may receive a no-DAO message or other path removal instruction that indicates a new sequence number. The new sequence number may corresponds to the new parent association between the neighbor and the child node (e.g., the same sequence number indicated in the notification received from the neighbor in step 710).

At step 725, the device may remove the updated routing path through the neighbor to the child node, as described in greater detail above. In other words, in response to receiving the instruction to remove the existing routing path that traverses both the device and the neighbor to the child node, the device may remove this path. In some cases, the device may remove/uninstall the updated routing path based on a comparison between the sequence numbers included in the notification of step 710 and the instruction of step 720 (e.g., if the sequence numbers match). Procedure 700 then ends at step 730.

Figure 8:
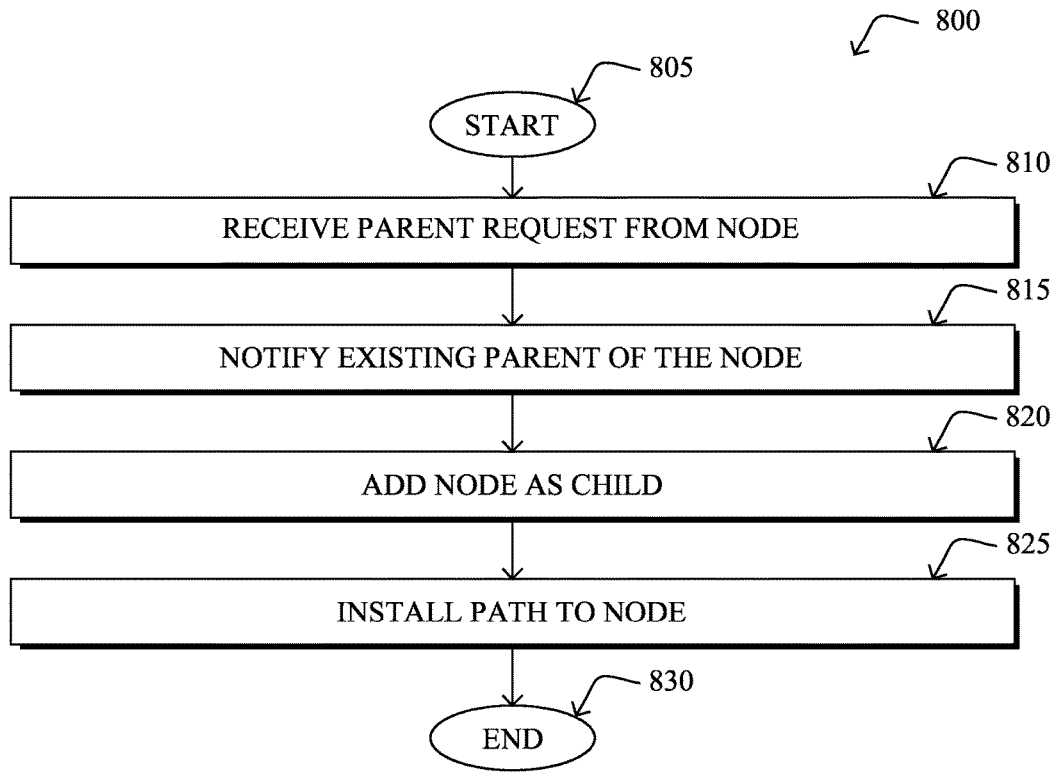
FIG. 8 illustrates an example simplified procedure for accepting a new child device/node.

FIG. 8 illustrates an example simplified procedure for accepting a new child device/node, according to various embodiments. In general, procedure 800 may be performed by any node/device (e.g., device 200) that is operable to accept another node as a child of the device in the network. In some embodiments, the device may be a neighbor of the existing parent of the node requesting to be added as a child of the device. Procedure 800 begins at step 805 and continues on to step 810 where, as described in greater detail above, the device receives a request from the node to add the node as a child of the device. For example, the request may comprise a neighbor solicitation message or other message indicative of the node attempting to add the device as its parent in the network. In some embodiments, the request may identify the neighbor/current parent of the node. In further embodiments, the request may also include the address of the requesting node (e.g., for purposes of ensuring that the address is not a duplicate address in the network). The request may also include a sequence number generated by the node, to facilitate cleanup of the routing path through the neighbor at a later point in time.

At step 815, as detailed above, the device provides a notification to the neighbor/prior parent of the child node. In one embodiment, the notification may be a proxy neighbor solicitation request that causes the neighbor to begin routing traffic destined for the child node through the device. Thus, even if the child node has moved out of range of the neighbor, packets sent over the existing routing path through the neighbor may still reach the child node, while the routing path through the new parent is installed.

In some embodiments, the notification may indicate the address of the child node. In turn, the neighbor may perform address validation (e.g., determine whether the address is a duplicate address, etc.) using the address included in the notification sent to the neighbor. For example, the neighbor may maintain a certificate signed by the border router or other authorized device as part of a DAR/DAC exchange that validates the address of the child node. In such a case, the neighbor may validate the address for the device (e.g., by providing the certificate to the device, sending another indication regarding the validity of the address to the device, etc.). As would be appreciated, by having the neighbor perform address validation, no DAR/DAC flows are needed, thereby reducing the amount of traffic generated as a result of the parent change. In addition, latency may be reduced when effecting the parent change. In some cases, the new parent may indicate a shorter registration time than that requested by the child node in the neighbor solicitation, if the new parent did not initiate a DAR/DAC exchange, to ensure that a future registration will take place with the border router/root before the original registration elapses at the border router. In particular, a certificate signed by the border router may have a lifespan that is long enough to cover the duration of the registration state.

At step 820, the device may add the child node as a child of the device, as described in greater detail above. In doing so, the device may begin forwarding any packets destined for the child node directly to the child node. In addition, the device may also cause any affected transmission schedules to be updated (e.g., to provide a unicast schedule between the device and the new child, etc.).

At step 825, as detailed above, the device may cause a new routing path to be installed in the network from a border router/root node in the network to the child node via the device. For example, the device may begin propagation of a routing protocol message (e.g., a DAO, etc.) that causes a new routing path to be installed in the network that does not include the neighbor/prior parent of the child node. In some embodiments, the routing protocol message may include the sequence number generated by the child node when requesting the parent change. This sequence number may be used by any of the upstream devices in the network to initiate cleanup of the older routing path to the child through the neighbor/former parent of the child (e.g., by comparing the sequence number to the sequence number of the older routing path). In various cases, the device may send the routing protocol message in response to the notification received in step 810 (e.g., if the child node is not configured to use the routing protocol) or in response to receiving a corresponding routing protocol message from the child node (e.g., if the child node is also configured to use the routing protocol). Procedure 800 then ends at step 830.

Figure 9:
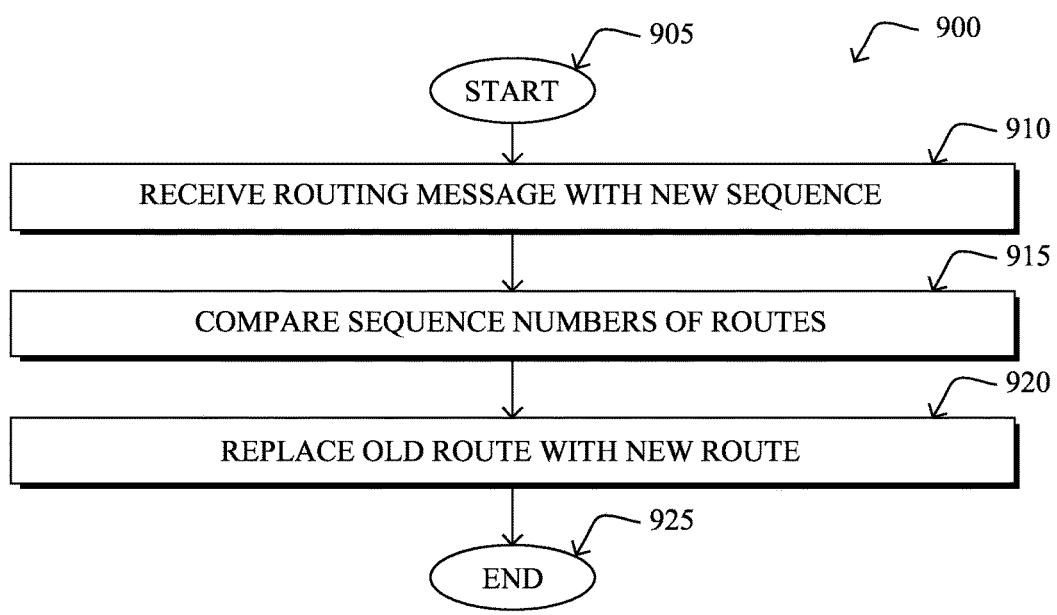
FIG. 9 illustrates an example simplified procedure for removing an outdated routing path to a device/node.

FIG. 9 illustrates an example simplified procedure for removing an outdated routing path to a device/node, according to various embodiments. In general, procedure 900 may be performed by any node/device (e.g., device 200) in a network operable to route traffic in the network. Procedure 900 may begin at step 905 and continue on to step 910 where, as described in greater detail above, the device may receive a routing protocol message that indicates a new routing path to a particular node in the network and a new sequence number associated with the new routing path. For example, the device may receive the routing protocol message when a parent change is initiated in the network whereby the particular node is switching from one parent to another. In such a case, a new routing path may be constructed to span from the border router/root of the network to the particular node via the new parent of the node and exclude the old parent.

At step 915, as detailed above, the device may perform a comparison between the new sequence number and an existing sequence number associated with an existing routing path to the particular node maintained by the device (e.g., through the older parent of the particular node). For example, assume that the device previously received a sequence number associated with the existing routing path to the particular node that spans through the node's parent that is going to be replaced with the new parent. In such a case, the device may compare the new sequence number received in step 910 with the existing sequence number, to determine that the existing routing path through the former parent can be removed/uninstalled in the network.

At step 920, the device may replace the old routing path to the node that switched parents with the new routing path through the new parent, as described in greater detail above. Notably, if the new path is constructed from the new parent of the particular node, the device may remove the old path through the old parent, based on the comparison of step 915. In further embodiments, the device may also cause one or more of its own children to remove/uninstall the existing routing path through the older parent of the particular node. For example, the device may send a no-DAO message or similar instruction that includes the new sequence number. In response, any of the receiving nodes may compare the sequence of the existing routing path to the new sequence number and, based on the comparison, remove the existing routing path to the particular node through its former parent. Procedure 900 then ends at step 925.

It should be noted that while certain steps within procedures 700-900 may be optional as described above, the steps shown in FIGS. 7-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-900 are described separately, certain steps from each procedure may be incorporated into each other procedure, and the procedures are not meant to be mutually exclusive.

The techniques described herein, therefore, provide for mechanisms that facilitate device mobility in LLNs and other mesh networks. In some aspects, the techniques herein allow for devices to move within a mesh, while ensuring that packets that are already on the way down the routing path through the prior parent are still delivered. In further aspects, the techniques herein support proactively cleaning up the prior routing path, whereas traditional routing protocols such as RPL only deprecate paths passively after a timeout. In another aspect, the techniques herein provide address validation mechanisms that allow a neighbor/prior parent to validate the address of a moving node, thereby reducing the amount of traffic in a constrained network, since a DAR/DAC exchange is no longer needed with the border router.

While there have been shown and described illustrative embodiments that provide for device mobility in a mesh network, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of computing networks. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, a notification from a neighbor of the device indicative of a child node of the device requesting a parent change from the device to the neighbor, wherein the notification includes a sequence number generated by the child node and an address of the child node, wherein the network is a mesh network;
   validating, by the device, that the address of the child node is not a duplicate address used in the network, wherein validating is based on receiving a signed certificate as part of a duplicate address confirmation message that is indicative of the address not being a duplicate address in the network;
   providing, by the device, the signed certificate to the neighbor to notify the neighbor that the address of the child node is valid;
   updating, by the device, an existing routing path from the device to the child node to be routed through the neighbor, in response to receiving the notification from the neighbor;
   receiving, at the device, an instruction to remove the updated routing path from the device to the child node through the neighbor, wherein the instruction includes a new sequence number; and
   removing, by the device, the updated routing path from the device to the child node if the new sequence number matches the sequence number received in the notification, in response to receiving the instruction to remove the updated routing path.

2. The method as in claim 1, further comprising:
   receiving, at the device, a neighbor solicitation message from the child node that includes the sequence number; and
   adding, by the device, the child node as a child of the device in the network, in response to receiving the neighbor solicitation message from the child node.

3. The method as in claim 2, further comprising:
   including, by the device, the sequence number in a routing protocol message used to construct a routing path in the network that stems from a root node of the network to the child node via the device.

4. The method as in claim 2, wherein removing the updated routing path from the device to the child node comprises:
   determining, by the device, that the updated routing path from the device to the child node is to be removed based in part on a comparison between the new sequence number included in the instruction and the sequence number received in the neighbor solicitation message from the child node.

5. The method as in claim 1, further comprising:
   forwarding, by the device, a data packet to the child node via the updated routing path through the neighbor, prior to removing the updated routing path from the device.

6. The method as in claim 1, wherein the notification received by the device from the neighbor comprises a proxy neighbor solicitation message that is based on a neighbor solicitation message sent from the child node to the neighbor to initiate the parent change.

7. The method as in claim 1, further comprising:
   receiving, at the device, a routing protocol message that indicates a new routing path to a particular node in the network and the new sequence number;
   performing, by the device, a comparison between the new sequence number and an existing sequence number associated with an existing routing path to the particular node maintained by the device; and
   replacing, at the device, the existing routing path to the particular node with the new routing path based on the comparison between the new sequence number and the existing sequence number.

8. The method as in claim 7, further comprising:
   providing, by the device, an instruction to one or more nodes in the network to remove the existing routing path to the particular node.

9. A method comprising:
   receiving, at a device in a network, a request from a node in the network to establish the device as a parent of the node, wherein the request indicates an existing parent of the node in the network, wherein the network is a mesh network;
   providing, by the device, a notification to the existing parent of the node regarding the received request to establish the device as the parent of the node, wherein the notification includes an address of the node;

receiving, at the device, validation from the existing parent of the node that the address of the node is not a duplicate address in the network;

adding, by the device, the node as a child of the device; and causing, by the device, installation of a routing path from a root of the network to the node via the device.

10. The method as in claim 9, wherein the existing parent of the node is a neighbor of the device in the network, and wherein the neighbor is configured to update an existing routing path from the neighbor to the node to be routed through the device, in response to the neighbor receiving the notification.

11. The method as in claim 9, wherein the notification comprises a proxy neighbor solicitation message that is based on the request received from the node to establish the device as the parent of the node.

12. The method as in claim 11, wherein the request to establish the device as the parent of the node comprises a sequence number, and wherein the proxy neighbor solicitation message sent to the existing parent of the node indicates the sequence number.

13. The method as in claim 9, further comprising:
receiving, at the device, a routing protocol message that indicates a new routing path to a particular node in the network and an associated new sequence number;
performing, by the device, a comparison between the new sequence number and an existing sequence number associated with an existing routing path to the particular node maintained by the device; and
replacing, at the device, the existing routing path to the particular node with the new routing path based on the comparison between the new sequence number and the existing sequence number.

14. The method as in claim 9, wherein the request to establish the device as the parent of the node comprises a sequence number, and wherein causing installation of the routing path from the root of the network to the node via the device comprises:
including, by the device, the sequence number in a routing protocol message sent from the device to a parent of the device in the network.

15. An apparatus, comprising:
one or more network interfaces to communicate with a network;
a processor coupled to the network interfaces and configured to execute one or more processes; and
a memory configured to store a process executable by the processor, the process when executed operable to:
receive a notification from a neighbor of the apparatus indicative of a child node of the apparatus requesting a parent change from the apparatus to the neighbor, wherein the notification includes a sequence number generated by the child node and an address of the child node, wherein the network is a mesh network;
validate that the address of the child node is not a duplicate address used in the network, wherein validating is based on receiving a signed certificate as part of a duplicate address confirmation message that is indicative of the address not being a duplicate address in the network;
provide the signed certificate to the neighbor to notify the neighbor that the address of the child node is valid;
update an existing routing path from the apparatus to the child node to be routed through the neighbor;
receive an instruction to remove the updated routing path from the apparatus to the child node, wherein the instruction includes a new sequence number; and
remove the updated routing path from the apparatus to the child node if the new sequence number matches the sequence number received in the notification, in response to receiving the instruction to remove the updated routing path.

16. The apparatus as in claim 15, wherein the process when executed is further operable to:
forward a data packet to the child node via the updated routing path through the neighbor, prior to removing the updated routing path from the apparatus.

17. An apparatus, comprising:
one or more network interfaces to communicate with a network;
a processor coupled to the network interfaces and configured to execute one or more processes; and
a memory configured to store a process executable by the processor, the process when executed operable to:
receive a request from a node in the network to establish the apparatus as a parent of the node, wherein the request indicates an existing parent of the node in the network, wherein the network is a mesh network;
provide a notification to the existing parent of the node regarding the received request to establish the apparatus as the parent of the node, wherein the notification includes an address of the node;
receive validation from the existing parent of the node that the address of the node is not a duplicate address in the network;
add the node as a child of the apparatus; and
cause installation of a routing path from a root of the network to the node via the apparatus.

18. The apparatus as in claim 17, wherein the notification comprises a proxy neighbor solicitation message that is based on the request received from the node to establish the apparatus as the parent of the node.

* * * * *